(12) United States Patent
Dubois et al.

(10) Patent No.: US 10,275,476 B2
(45) Date of Patent: Apr. 30, 2019

(54) MACHINE TO MACHINE DATA AGGREGATOR

(71) Applicant: Verizon Patent and Licensing Inc., Arlington, VA (US)

(72) Inventors: Jean F. Dubois, Boothbay Harbor, ME (US); Patrick J. Moran, Shrewsbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 409 days.

(21) Appl. No.: 14/579,307

(22) Filed: Dec. 22, 2014

(65) Prior Publication Data
US 2016/0179849 A1    Jun. 23, 2016

(51) Int. Cl.
*G06F 17/30*    (2006.01)

(52) U.S. Cl.
CPC ............... *G06F 17/30292* (2013.01)

(58) Field of Classification Search
CPC ................................................. G06F 17/30292
USPC ......................................................... 707/803
See application file for complete search history.

(56) References Cited

U.S. PATENT DOCUMENTS

| | | | | |
|---|---|---|---|---|
| 7,257,594 B2* | 8/2007 | Tamboli | ............ | G06F 17/30569 |
| 7,299,237 B1* | 11/2007 | Clark | .................... | G06F 17/303 |
| 7,937,480 B2* | 5/2011 | Alperovitch | ............ | H04L 51/12 |
| | | | | 709/206 |
| 8,190,633 B2* | 5/2012 | Freire | ............... | G06F 17/30312 |
| | | | | 707/778 |
| 8,250,026 B2* | 8/2012 | Mok | ................. | G06F 17/30554 |
| | | | | 707/602 |
| 8,261,193 B1* | 9/2012 | Alur | ..................... | G06Q 10/101 |
| | | | | 715/742 |
| 8,266,148 B2* | 9/2012 | Guha | ................ | G06F 17/30867 |
| | | | | 707/737 |
| 8,291,475 B2* | 10/2012 | Jackson | ................... | G06F 21/54 |
| | | | | 709/203 |
| 8,386,510 B2* | 2/2013 | Farrell | .............. | G06F 17/30525 |
| | | | | 707/765 |
| 8,489,578 B2* | 7/2013 | Bhagwan | .......... | G06F 17/30539 |
| | | | | 707/710 |
| 8,838,748 B2* | 9/2014 | Nair | .......................... | G06F 8/38 |
| | | | | 709/203 |
| 8,849,909 B2* | 9/2014 | Farmer | .................. | G06Q 10/06 |
| | | | | 709/204 |
| 8,949,175 B2* | 2/2015 | Wu | ........................... | G06F 9/46 |
| | | | | 707/602 |
| 8,972,951 B2* | 3/2015 | Hadar | ................. | G06F 17/3089 |
| | | | | 717/127 |
| 9,053,086 B2* | 6/2015 | Dubbels | ................ | G06F 17/227 |
| 9,053,437 B2* | 6/2015 | Adler | ..................... | G06Q 10/00 |

(Continued)

*Primary Examiner* — Miranda Le

(57) ABSTRACT

A computer system may include data aggregator logic configured to ingest a data item from a data source via an aggregation socket, wherein the aggregation socket is configured to ingest data items of a particular data type; identify a schema associated with the aggregation socket; convert the data item into a common data format using the identified schema; store the converted data item in a common data format storage associated with the computer device; and provide the stored data item to a data utilization system. The computer system may further maintain and record provenance and reputation models associated with data items stored in the common data format storage.

20 Claims, 15 Drawing Sheets

(56) References Cited

U.S. PATENT DOCUMENTS

| | | | |
|---|---|---|---|
| 9,092,502 B1* | 7/2015 | Cannaliato | G06F 17/30595 |
| 9,215,196 B2* | 12/2015 | Singh | G06Q 20/40 |
| 9,336,332 B2* | 5/2016 | Davis | G06F 17/30991 |
| 9,418,065 B2* | 8/2016 | Avery | G06F 17/30067 |
| 9,495,436 B2* | 11/2016 | Nivargi | G06F 17/30592 |
| 9,507,820 B1* | 11/2016 | Hannah | G06F 17/30292 |
| 9,558,286 B2* | 1/2017 | Jeffery | G06F 17/3089 |
| 2002/0133365 A1* | 9/2002 | Grey | G06Q 30/02 705/7.29 |
| 2004/0210552 A1* | 10/2004 | Friedman | G06F 17/30864 |
| 2005/0228805 A1* | 10/2005 | Britton | G06F 17/30424 |
| 2006/0136449 A1* | 6/2006 | Parker | G06F 17/30557 |
| 2007/0050206 A1* | 3/2007 | Whikehart | G06Q 10/04 705/2 |
| 2007/0088957 A1* | 4/2007 | Carson | G06F 21/64 713/176 |
| 2007/0180468 A1* | 8/2007 | Gill | G06F 21/10 725/45 |
| 2008/0114725 A1* | 5/2008 | Indeck | G06F 17/30985 |
| 2008/0120309 A1* | 5/2008 | Copeland | G06F 17/30309 |
| 2008/0127812 A1* | 6/2008 | Sako | H04N 21/6547 84/625 |
| 2009/0248690 A1* | 10/2009 | Bhagwan | G06F 17/30864 |
| 2010/0114844 A1* | 5/2010 | Xiong | G06F 17/30893 707/693 |
| 2012/0030581 A1* | 2/2012 | Cui | G06F 8/36 715/744 |
| 2012/0130863 A1* | 5/2012 | Tedjamulia | G06Q 30/0641 705/27.1 |
| 2012/0179752 A1* | 7/2012 | Mosley | G06Q 10/10 709/204 |
| 2012/0197902 A1* | 8/2012 | Bhagwan | G06F 17/30899 707/748 |
| 2013/0166471 A1* | 6/2013 | Fukuda Kelley | G06F 17/30038 705/344 |
| 2014/0033172 A1* | 1/2014 | Armstrong | G06F 8/71 717/121 |
| 2014/0358911 A1* | 12/2014 | McCarthy | G06F 17/30864 707/723 |
| 2014/0358975 A1* | 12/2014 | Nivargi | G06F 17/30592 707/811 |
| 2015/0100570 A1* | 4/2015 | Zent | G06F 17/30675 707/723 |
| 2015/0206102 A1* | 7/2015 | Cama | G06Q 10/1053 705/321 |
| 2016/0019272 A1* | 1/2016 | Liu | G06F 17/30563 707/756 |

* cited by examiner

MACHINE TO MACHINE DATA AGGREGATOR

BACKGROUND INFORMATION

In a particular field of endeavor, many different types of information may be collected and made available. As an example, different sensors may collect different types of information and may store the information in different formats. As another example, users may enter information using different applications with different formats. Furthermore, data acquisition may take place over an extended period of time and analysis of the data may be delayed as a result. Moreover, obtained data may not be accurate and systems relying on the obtained data may make important decisions based on such inaccurate data. Thus, systems that rely on different types of data face various challenges.

DETAILED DESCRIPTION OF PREFERRED EMBODIMENTS

Figure 1:
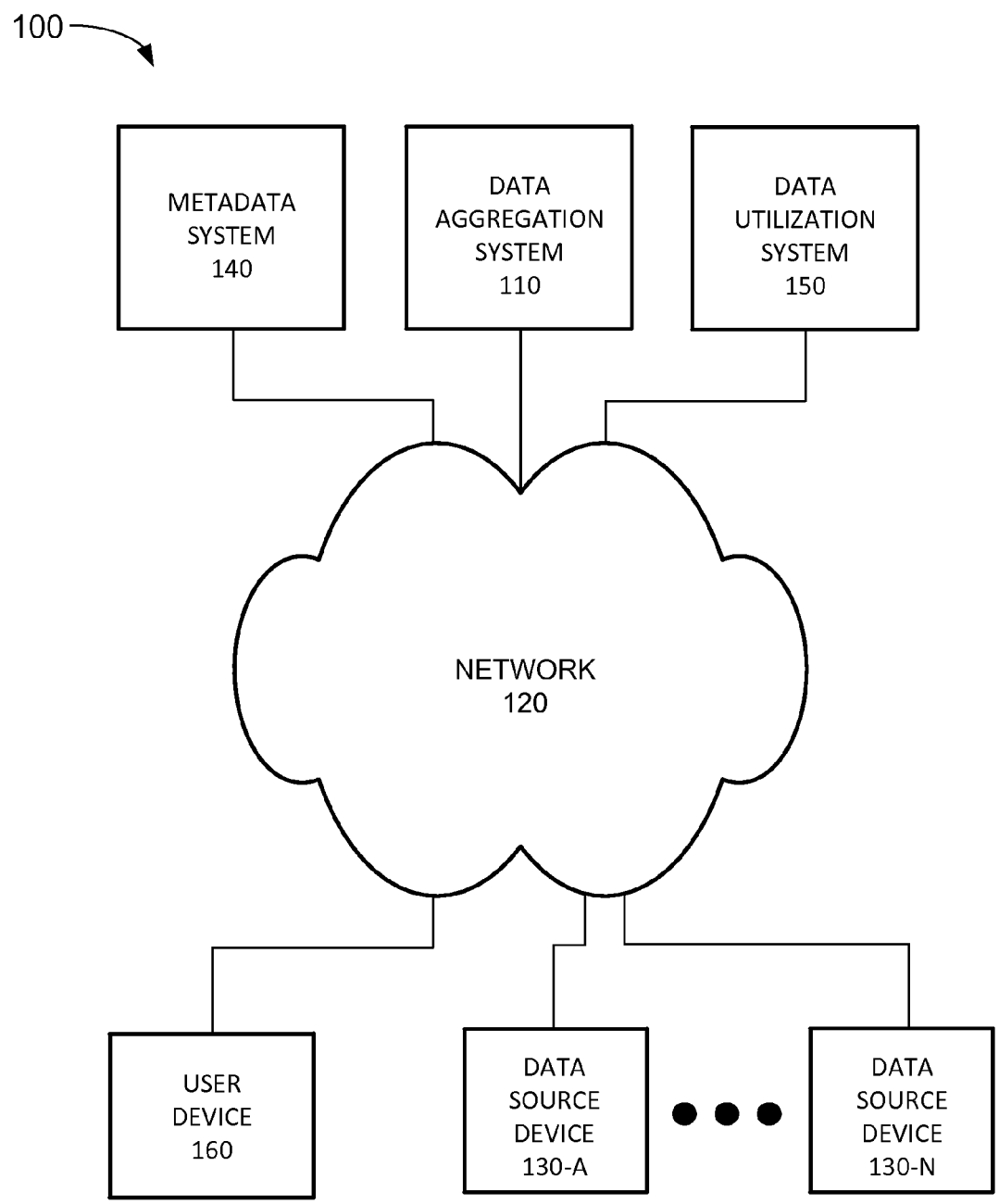
FIG. 1 is a diagram illustrating an environment according to one or more implementations described herein.

The following detailed description refers to the accompanying drawings. The same reference numbers in different drawings identify the same or similar elements.

Implementations described herein relate to a machine to machine (M2M) data aggregator and to a metadata system associated with the M2M data aggregator. The data aggregator may collect information from multiple data sources, in which different data sources use different data formats. As an example, different sensors may collect similar types of data in different data formats. As another example, different user applications may obtain user data and store the user data using different data fields. The data aggregator may interface with a data source device using an aggregation socket. The aggregation socket may be configured to ingest data from the data source and to provide the data to a communication bus.

The communication bus may be coupled to a schema repository, which stores schemas for different data formats. The communication bus may identify a schema associated with the data format of the data received via the data aggregator, may use the schema to convert the data into a common data format, and may store the data, in the common data format, in a common data format storage. Different aggregation sockets may receive data in different formats and the communication bus may use different schemas to convert data received in the different formats into the common data format. The schema may be generated based on information provided by an entity associated with the data source. For example, the entity may specify particular data fields for the data received from the data source and/or may specify a field of use for data ingested from the data source.

Furthermore, the data aggregator may include one or more data processing modules that may be used to process a data item received via an aggregation socket. A data processing module may perform one or more data processing functions on a data item. A particular data processing module may be used for data items of a particular type or may be used for all data items. For example, a data processing module may perform data tagging to tag a particular piece of data with classification tags and/or entity-relationship tags, such as Resource Description Framework (RDF) tags. Once data items are converted to the common data format, the data may be made available to a data utilization system, and/or to user devices, which may utilize the data for various purposes. For example, data from different data sources may be used by the data utilization system to perform statistical analysis in a particular field of use.

The data aggregator may be coupled with a metadata system that may generate various types of metadata for data ingested and aggregated by the data aggregator. For example, the metadata system may include a reputation engine that maintains reputation scores for entities, data sources, and/or data items associated with the data aggregator. An entity or a data source may be assigned an initial reputation score and the reputation score may be modified based on how data associated with the entity or data source is used by other parties or devices. As an example, if a second device, with a higher reputation score than a first device, uses data generated by the first device over a particular time period, or a particular number of times, it may be an indication that the second device trusts data generated by the first device, and the reputation score of the first device may be increased. As another example, if the second device indicates that the data generated by the first device is unreliable, the reputation score of the first device may be decreased. Maintaining reputation scores for data sources and/or entities may provide a measure of reliability for data items associated with the data sources and/or entities.

Furthermore, the metadata system may include a provenance engine. Provenance may refer to a record of how a particular data item has been accessed, modified, and/or otherwise used over a period of time (e.g., from the creation of the data item to the current time). The provenance engine may generate a provenance record for a data item and may update the provenance record whenever a provenance event is detected. A provenance event may be detected whenever the data item, stored or associated with the common data format storage, is accessed, modified, and/or otherwise used.

For example, the data aggregator may alert the provenance engine whenever the data item is accessed or modified. The provenance engine may determine one or more provenance parameters for the provenance event, such as the "who," "what," "when," "where," and "why" of the provenance event, and may record the provenance parameters in the provenance record associated with the data item. Maintaining provenance records for data items may enable tracking of how particular data items have been used over a period of time.

The phrase "data item," as used herein, may include any machine-readable and/or machine-storable string of symbols. A data item may include, for example, a data entry generated by an application, a measurement made by a sensor, an audio file, a video file, an image, a message (e.g., email message, instant messaging message, Short Message Format (SMS) message, a social media update, etc.), a web page or another type of document, and/or another type of file or combination of files.

FIG. 1 is a diagram of an exemplary environment 100 in which the systems and/or methods, described herein, may be implemented. As shown in FIG. 1, environment 100 may include a data aggregation system 110, a network 120, data source devices 130-A to 130-N, a metadata system 140, a data utilization system 150, and a user device 160.

Data aggregation system 110 may include one or more devices, such as computer devices and/or server devices, which perform data aggregation on data items generated by data sources 130, data utilization system 150, and/or user device 160 and provided to data aggregation system 110 via network 120. For example, data aggregation system 110 may ingest data items in various data formats and may convert the data items into a common data format. Data aggregation system 110 may make the ingested data items available to metadata system 140 for metadata processing, and/or may make the ingested data items available to data utilization system 150 and/or user device 160 to utilize the data items.

Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks. Network 120 may include one or more base stations (not shown in FIG. 1), such as, for example, a Long Term Evolution eNodeB base station, a Global System for Mobile Communications (GSM) base station, a Code Division Multiple Access (CDMA) base station, and/or another type of base station. Network 120 may enable the devices in environment 100 to communicate with each other.

Data source devices 130 may include any device that generates data items and provides the data items to data aggregation system 110. As an example, data source device 130 may include a sensor, such a body sensor (e.g., a heart rate sensor, a body temperature sensor, a pedometer, etc.), an environment sensor (e.g., a temperature sensor, a humidity sensor, a light sensor, etc.), a security sensor (e.g., a motion detector, a door sensor, etc.), a camera, a microphone, and/or another type of sensor. As another example, data source device 130 may include a communication device, such as a network device (e.g., a switch, router, gateway, firewall, fiber distribution frame, optical terminal, reconfigurable optical add-drop multiplexer, etc.), a customer premises device (e.g., a set-top box, an optical network terminal, a WiFi access point, etc.), and/or another type of communication device. As yet another example, data source device 130 may include a device running an application that generates data items, such as a server device that collects data from user devices.

Metadata system 140 may include one or more devices, such as computer devices and/or server devices, which generate and/or modify metadata for data items aggregated by data aggregation system 110. For example, metadata system 140 may include a reputation engine that maintains reputation scores for data source devices 130, entities associated with data source devices 130, and/or data items ingested from data source devices 130 and aggregated by data aggregation system 110. Furthermore, metadata system 140 may include a provenance engine that maintains provenance data for data items ingested from data source devices 130 and aggregated by data aggregation system 110.

Data utilization system 150 may include one or more devices, such as computer devices and/or server devices, which utilize data items ingested from data source devices 130 and aggregated by data aggregation system 110 and converted into a common data format. For example, data utilization system 150 may analyze the aggregated data for statistical information, may determine particular trends in the data, may organize the data into a format for an application running on user device 160, may determine whether a particular condition has been met to activate a particular function in user device 160, and/or may utilize the aggregated data in other ways.

User device 160 may include a portable communication device such as a tablet computer, a laptop computer, a mobile phone, a smart phone, a phablet computer device, a wearable computer device (e.g., a an optical head-mounted display device, a wristwatch smartphone device, etc.), and/or any other type of mobile computer device with wireless communication and output capabilities. In other implementations, user device 160 may include a desktop computer device, a server device, and/or another type of stationary computer device. User device 160 may include one or more applications that may provide data to data aggregation system 110. Additionally or alternatively, user device 160 may include one or more applications that utilize data aggregation by data aggregation system 110 and/or further processed by data utilization system 150. Thus, user device 160 may utilize the aggregated data via data utilization system 150 and/or directly via data aggregation system 110, depending on a particular implementation.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
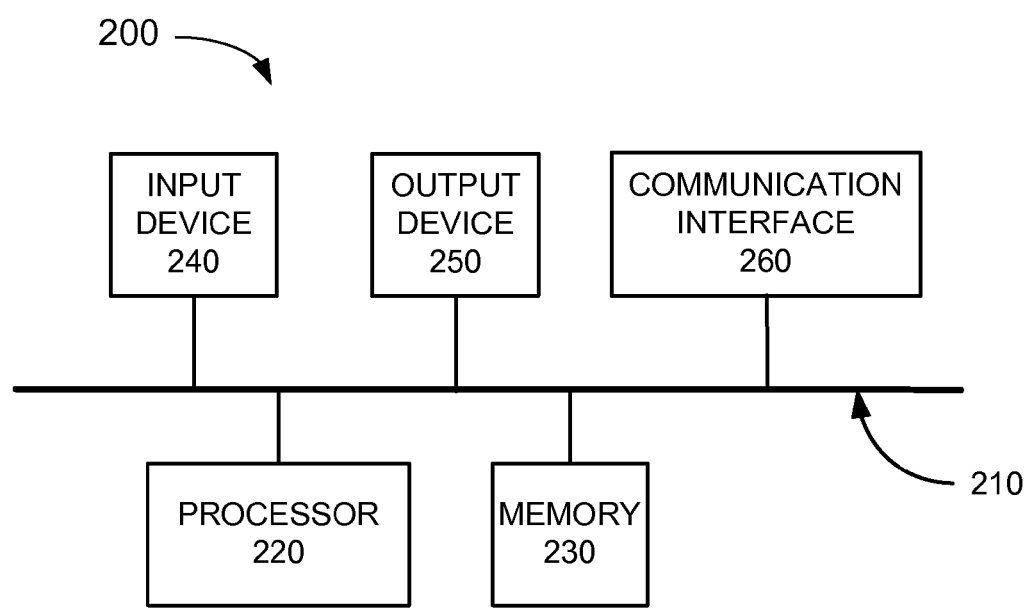
FIG. 2 is a diagram illustrating exemplary components of a computer device that may be included in one or more of the systems or devices of FIG. 1.

FIG. 2 is a diagram illustrating exemplary functional components of device 200 according to an implementation described herein. Data aggregation system 110, data source device 130, metadata system 140, data utilization system 150, and/or user device 160 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to aggregation, provenance, reputation, and/or utilization of data. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3A:
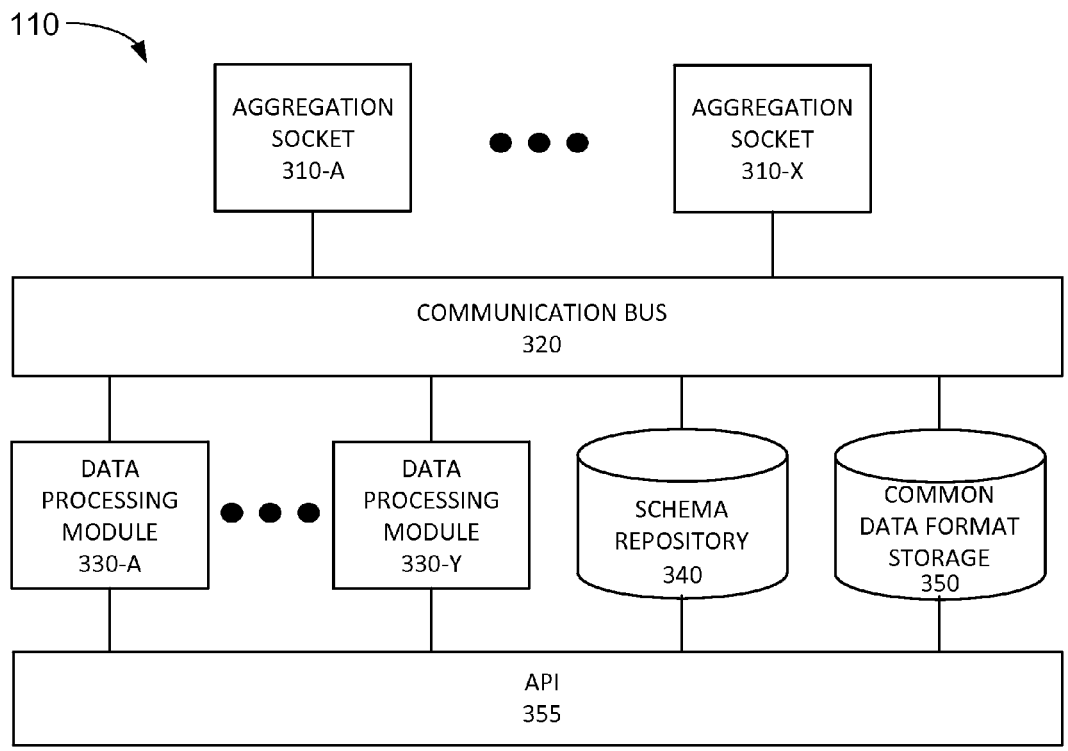
FIG. 3A is a diagram illustrating exemplary functional components of the aggregation system of FIG. 1.

FIG. 3A is a diagram illustrating exemplary functional components of data aggregation system 110 according to an implementation described herein. In some implementations, the functional components of data aggregation system 110 may be implemented, for example, via processor 220 executing instructions from memory 230. Alternatively, some or all of the functional components of data aggregation system 110 may be implemented via hard-wired circuitry. As shown in FIG. 3A, data aggregation system 110 may include aggregation sockets 310-A to 310-X, a communication bus 320, data processing modules 330-A to 330-Y, a schema repository 340, a common data format storage 350, and an application programming interface (API) 355.

A particular aggregation socket 310 may communicate with a particular data source device 130, or with a particular type of data source device 130 and/or with user device 160. For example, aggregation socket 310 may use a particular protocol to communicate with data source device 130 and/or user device 160. Data source device 130 and/or user device 160 may use the particular protocol to send data items to aggregation socket 310. Additionally or alternatively, aggregation socket 130 may use the particular protocol to request data items from data source device 130 and/or user device 160 at particular intervals. In some implementations, aggregation socket 310 may simulate a particular device and/or application to which data source device 130 and/or user device 160 is configured to send data.

Communication bus 320 may obtain data items from aggregation sockets 310 and may convert the obtained data items into a common data format using information stored in schema repository 340. Once a data item is converted to the common data format, the data item may be stored in common data format storage 350. Furthermore, communication bus 320 may provide the data item to one or more data processing modules 330, and/or to metadata system 140, for processing, or may send an alert relating to the obtained data item to one or more data processing modules 330, and/or to metadata system 140, based on information included in a schema associated with the aggregation socket 310 via which the data item has been received.

Data processing module 330 may perform one or more data processing functions with respect to data items received via aggregation sockets 310. A particular data processing module 330 may perform a data processing function on a data item before the data item is converted to the common data format or after the data item is converted to the common data format. A particular data processing module 330 may process all data items received by data aggregation system 110 or may process only particular types of data items. A particular data processing module 330 may process data items associated with a particular aggregation socket 310, associated with a particular entity (which may be associated with multiple aggregation sockets 310), associated with a particular field of use, associated with a particular time period, and/or associated with another category. For example, a data processing module 330 may perform RDF tagging on data items converted to the common data format. An RDF tagging module may be accessible via an application programming interface (API) and an originating entity for a particular schema (e.g., a manufacturer for a sensor device, a developer for an application, etc.) may access an RDF tagging module to add, remove, and/or modify an RDF tag to be applied to data items of a particular type. In addition to tagging incoming data items, if an RDF tagging module is re-configured to add another RDF tag to data items of a particular type, the RDF tagging module may pull existing data items from common data format storage 350 and may perform re-tagging on the existing data items based on the re-configuration.

As another example, a data processing module 330 may interface with data utilization system 150 via API 355, and the other device may process data items using the data processing module 330. As an example, data source device 130 may include a sensor and data processing module 330 may interface with a computer device that manages the sensor. As another example, an application on user device 160 may provide data items to data aggregation system 110 via aggregation socket 310 and data processing module 330 may interface with a server device that manages application data for the application.

Schema repository 340 may store schemas for particular aggregation sockets 310. Exemplary information that may be in schema repository 340 is described below with reference to FIG. 3B. Common data format storage 350 may store data items in a common data format. In some implementations, the common data format may include a compact binary format (e.g., a binary Extensible Markup Language (XML), etc.). In other implementations, the common data format may include a different type of data format. Data items need not be stored in common data format storage 350 in their entirety. For example, a data item may include a large video file stored at another location and common data format storage 350 may store metadata associated with the large video file.

API 355 may provide a standardized interface that enables data utilization system 150, user device 160, and/or other devices to communicate with data aggregation system 110. As an example, data utilization system 150 may use API 355 to generate a schema and to store the schema in schema repository 340. As another example, data utilization system 150 and/or user device 160 may use API 355 to access data stored in common data format storage 350. As yet another example, data utilization system 150 and/or user device 160 may use API 355 to generate a particular data processing module 330 and/or use the particular data processing module 330.

Although FIG. 3A shows exemplary functional components of data aggregation system 110, in other implementations, data aggregation system 110 may include fewer functional components, different functional components, differently arranged functional components, or additional functional components than those depicted in FIG. 3A. Additionally or alternatively, one or more functional components of data aggregation system 110 may perform functions described as being performed by one or more other functional components of data aggregation system 110.

Figure 3B:
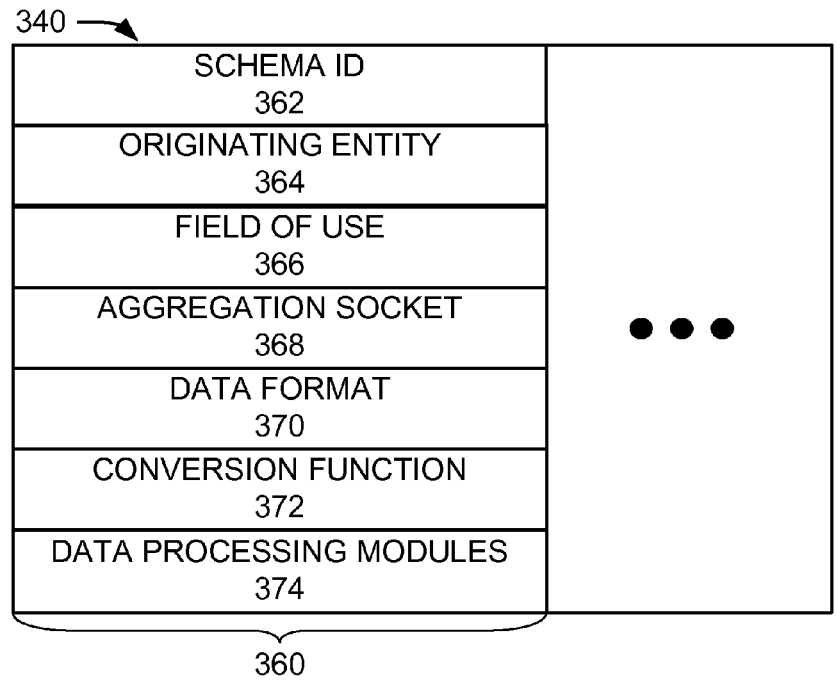
FIG. 3B is a diagram illustrating exemplary information that may be stored in the schema repository of the aggregation system of FIG. 1.

FIG. 3B is a diagram illustrating exemplary information that may be stored in schema repository 340. As shown in FIG. 3B, schema repository 340 may store one or more schema records 360. Schema record 360 may store information relating to a particular schema. Schema record 360 may include a schema identifier (ID) field 362, an originating entity field 364, a field of use field 366, an aggregation socket field 368, a data format field 370, a conversion function field 372, and a data processing modules field 374.

Schema ID field 362 may include an identifier for a particular schema. For example, schema ID field 362 may include a numerical ID or a string of characters, such as a name assigned to the particular schema. Originating entity field 364 may identify an entity that originated the particular schema. The entity may correspond to, for example, a business entity or an organization associated with a particular data source device 130 or an application running on user device 160.

Field of use field 366 may include information identifying a field of use for the particular schema (e.g., health, network devices, consumer products, weather, vehicles, etc.). Furthermore, fields of use may be organized in hierarchical categories. For example, a schema may be associated with a category and one or more sub-categories within the category.

Aggregation socket field 368 may identify one or more aggregation sockets 310 associated with the particular schema. A particular schema may be associated with multiple aggregation sockets 310 and a particular aggregation socket 310 may associated with multiple schemas.

Data format field 370 may specify a particular data type and/or particular data fields associated with data items associated with the particular schema. Conversion function field 372 may include one or more conversion functions to convert data items associated with the particular schema into the common data format.

Data processing modules field 374 may identify one or more data processing modules associated with the particular schema. If multiple data processing modules 330 are identified in data processing modules field 374, data processing module field 374 may specify a particular sequence in which the data processing modules 330 should process a data item. Furthermore, data processing modules field 374 may specify one or more conditions for each include data processing module 330 that specify when a data processing module 330 should be invoked to process a data item.

Although FIG. 3B shows exemplary fields of schema repository 340, in other implementations, schema repository 340 may include fewer fields, different fields, differently arranged fields, or additional fields than those depicted in FIG. 3B.

Figure 4A:
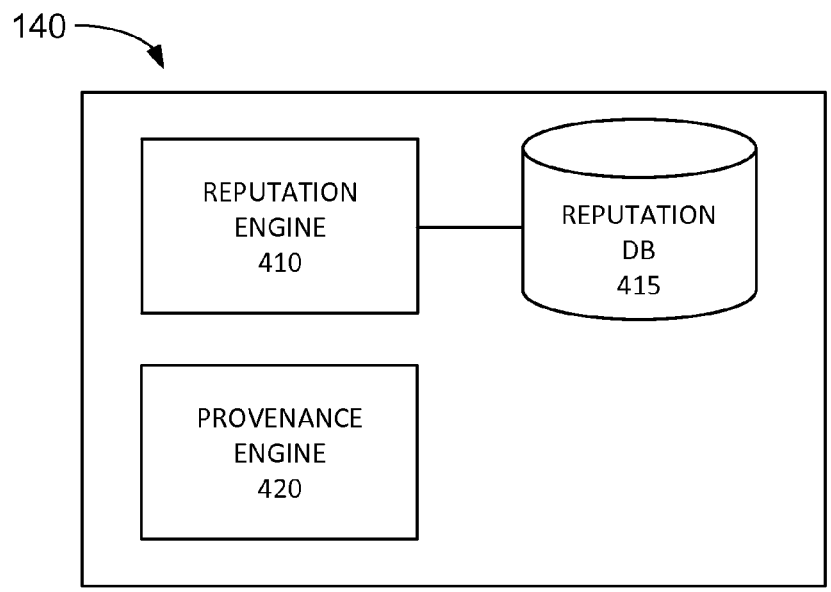
FIG. 4A is a diagram illustrating exemplary functional components of the metadata system of FIG. 1.

FIG. 4A is a diagram illustrating exemplary functional components of metadata system 140 according to an implementation described herein. In some implementations, the functional components of metadata system 140 may be implemented, for example, via processor 220 executing instructions from memory 230. Alternatively, some or all of the functional components of metadata system 140 may be implemented via hard-wired circuitry. As shown in FIG. 4A, metadata system 140 may include a reputation engine 410, a reputation database (DB) 415, and a provenance engine 420.

Reputation engine 410 may generate and/or maintain reputation scores for particular data source devices 130, applications running on user device 160, and/or particular entities and may assign reputation scores to data items associated with particular data source devices 130 and/or particular entities. Reputation DB 415 may store reputation information for data source devices 130, applications running on user device 160, and/or entities associated with data source device 130. An entity, application, or data source device 130 may be assigned an initial reputation score and the reputation score may be modified based how other entities, applications, or devices use data items generated by the entity, application, or data source device 130. For example, the reputation score may be increased if other entities, applications, or devices use the data items or decreased if other entities, applications, or devices indicate that the data items are inaccurate or unreliable.

Provenance engine 420 may generate and/or maintain provenance records for data items aggregated by data aggregation system 110. Exemplary information that may be stored in provenance engine 420 is described below with reference to FIG. 4B.

Although FIG. 4A shows exemplary functional components of metadata system 140, in other implementations, metadata system 140 may include fewer functional components, different functional components, differently arranged functional components, or additional functional components than those depicted in FIG. 4A. Additionally or alternatively, one or more functional components of metadata system 140 may perform functions described as being performed by one or more other functional components of metadata system 140.

Figure 4B:
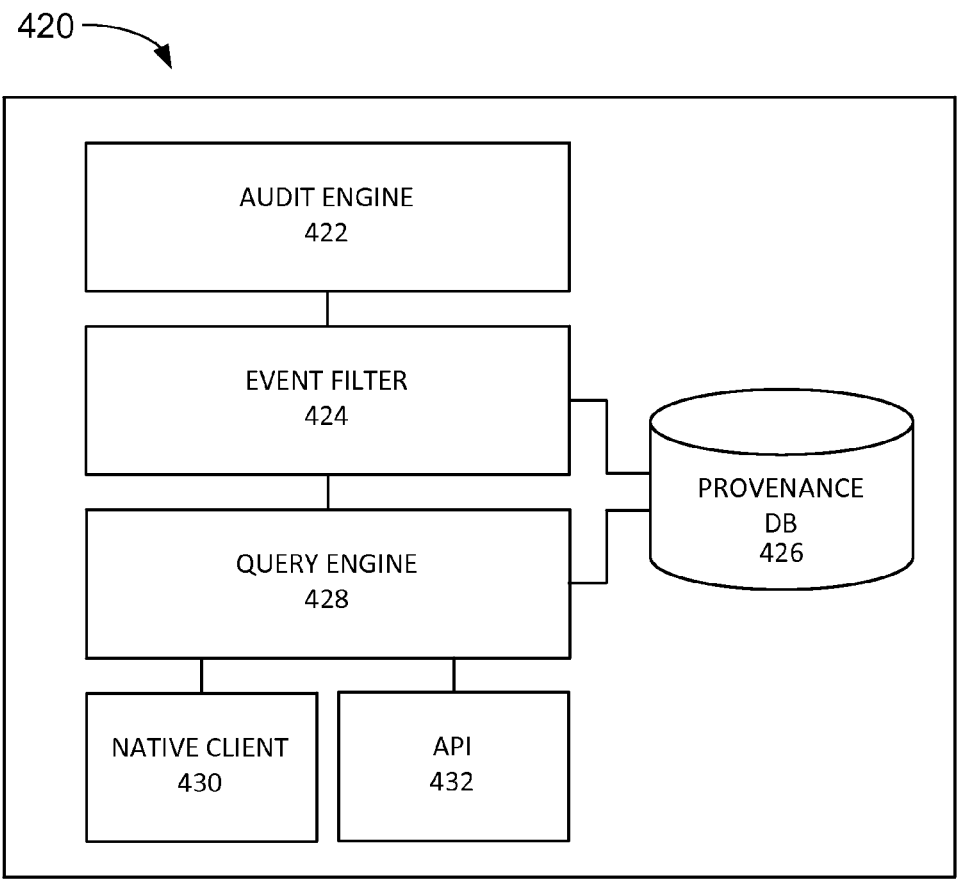
FIG. 4B is a diagram illustrating exemplary functional components of the provenance engine of FIG. 4A.

FIG. 4B is a diagram illustrating exemplary functional components of provenance engine 420 according to an implementation described herein. As shown in FIG. 4B, provenance engine 420 may include an audit engine 422, an event filter 424, a provenance DB 426, a query engine 428, a native client 430, and an API 432.

Audit engine 422 may audit data items to identify provenance events associated with data items. As an example, audit engine 422 may instruct common data format storage 350 to send an alert to provenance engine 420 whenever a particular data item is accessed, copied, modified and/or otherwise used by an entity, application, or device. As another example, audit engine 422 may receive indications of provenance records from other devices. For example, data utilization system 150 may be configured to alert provenance engine 420 when data utilization system 150 accesses data items in common format data storage 350. As yet another example, audit engine 422 may instruct an application running on user device 160 to inform audit engine 422 whenever the application accesses data items stored in common format data storage 350. Furthermore, if audit engine 422 detects a provenance event, audit engine 422 may obtain additional information about the provenance event by querying the device, application, or entity that originated the provenance event.

Event filter 424 may filter provenance records based on one or more criteria. For example, an entity may configure that only particular types of provenance events be recorded for particular types of data. As an example, event filter 424 may be configured to only record when a data item is modified and not when a data item is accessed. As another example, event filter 424 may be configured to record provenance events generated by a particular requesting party, generated during a particular time period, generated by a particular trigger event, etc.

Provenance DB 426 may store provenance records for data items associated with data aggregator system 110. Exemplary information that may be stored in provenance DB 426 is described below with reference to FIG. 4C.

Query engine 428 may process search queries to search provenance DB 426. For example, query engine 428 may receive a search query via native client 430 and/or API 432. Native client 430 may include a client application or function included in provenance engine 420 and configured to perform queries. API 432 may be configured to communicate with other systems or devices, such as data utilization system 150 and/or user device 160. For example, data utilization system 150 may send a query to query engine 428 via API 432 to determine which user devices 160 have accessed a particular data item.

Although FIG. 4B shows exemplary functional components of provenance engine 420, in other implementations, provenance engine 420 may include fewer functional components, different functional components, differently arranged functional components, or additional functional components than those depicted in FIG. 4B. Additionally or alternatively, one or more functional components of provenance engine 420 may perform functions described as being performed by one or more other functional components of provenance engine 420.

Figure 4C:
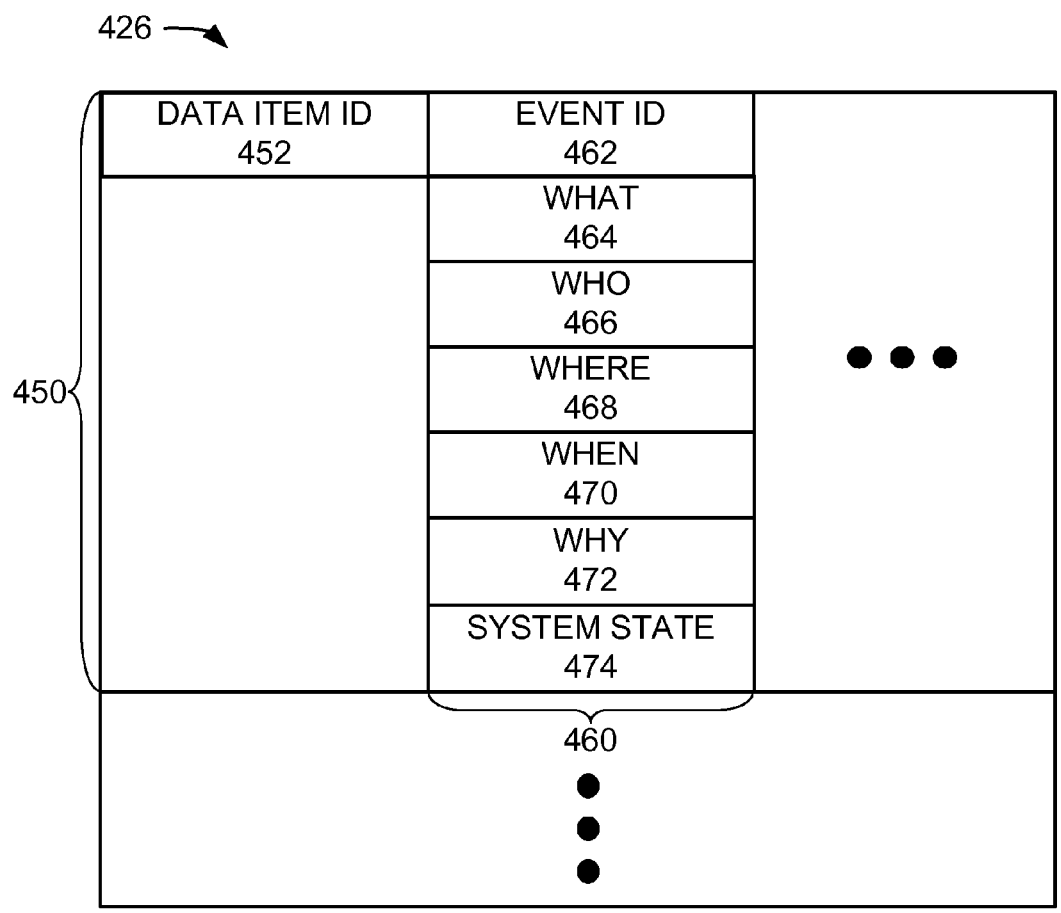
FIG. 4C is a diagram illustrating exemplary information that may be stored in the provenance database of FIG. 4B.

FIG. 4C is a diagram illustrating exemplary information that may be stored in provenance DB 426. As shown in FIG. 4C, provenance DB 426 may store one or more provenance records 450. Provenance record 450 may store information relating to provenance information for a particular data item. Provenance record 450 may include a data item ID field 452 and one or more provenance event records 460.

Data item ID field 452 may include an identifier associated with a particular data item. For example, the identifier may uniquely identify a data item stored in common format data storage 350. Provenance event record 460 may store information relating to a particular provenance event associated with the particular data item. For example, each time the particular data item is accessed, copied, modified, deleted, and/or associated with another type of action, a provenance event may be detected and a provenance record may be generated for the detected provenance record. Provenance event record 460 may include an event ID field 462, a what field 464, a who field 466, a where field 468, a when field 470, a why field 472, and a system state field 474.

Event ID field 462 may include an identifier for a particular provenance event. For example, the identifier may include an ordinal numerical value that is increased for each provenance event to identify a sequence of provenance events. What field 464 may include information identifying the type of provenance event (e.g., what has occurred). For example, what field 464 may identify an access event, an update event, a copy event, a delete event, a change to a particular data field, etc. Who field 466 may include information identifying a device, application, or entity associated with the particular provenance event. As an example, who field 466 may identify an application running on user device 160 that has accessed the particular data item. As another example, who field 466 may identify a particular data source device 130 that updates the particular data item.

Where field 468 may include information identifying a physical or network location associated with the particular provenance event. When field 470 may include information identifying a time and/or date associated with the particular provenance event. Why field 472 may include information identifying a cause of the particular provenance event. For example, if the particular provenance event includes a request to access the particular data item in response to a trigger event, why field 472 may include information identifying the trigger event.

System state field 474 may include information about the state of metadata system 140, data aggregation system 110, and/or data utilization system 150 at the time the particular provenance event occurred. For example, system state field 474 may identify whether a particular component, function, application, and/or connection of metadata system 140, data aggregation system 110, and/or data utilization system 150 was functioning, the capacity of the particular component, function, application, and/or connection, and/or another type of system state information.

Although FIG. 4C shows exemplary fields of provenance DB 426, in other implementations, provenance DB 426 may include fewer fields, different fields, differently arranged fields, or additional fields than those depicted in FIG. 4C.

Figure 5:
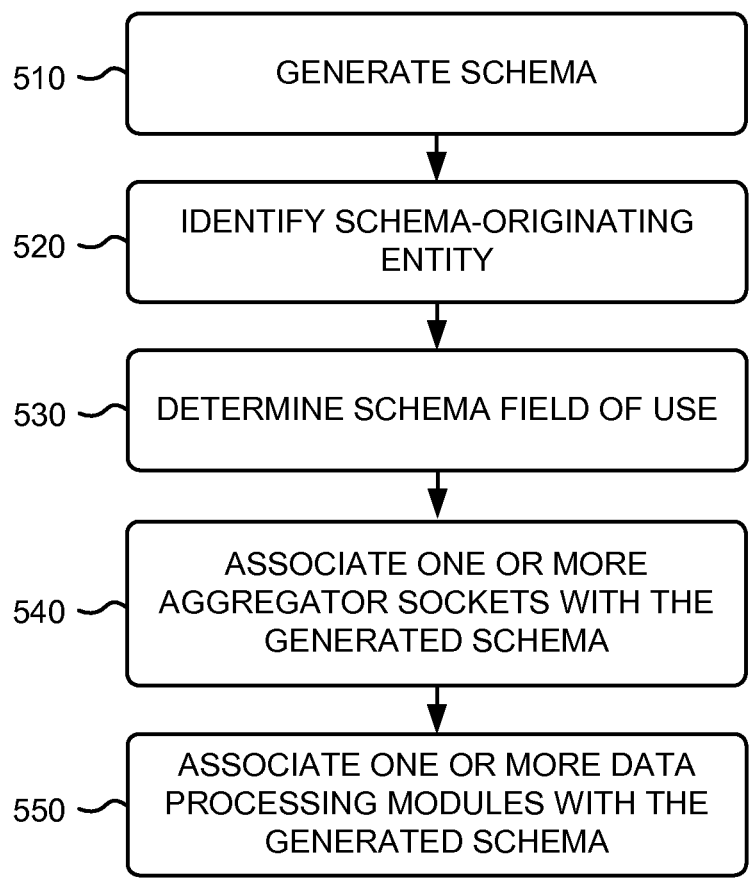
FIG. 5 is a flowchart for generating a schema for a particular type of data according to an implementation described herein.

FIG. 5 is a flowchart for generating a schema for a particular type of data according to an implementation described herein. In some implementations, the process of FIG. 5 may be performed by data aggregation system 110. In other implementations, some or all of the process of FIG. 5 may be performed by another device or a group of devices separate from and/or including data aggregation system 110. Furthermore, in other implementations, the process of FIG. 5 may include fewer blocks, additional blocks, different blocks, or differently arranged blocks.

The process of FIG. 5 may include generating a schema (block 510). For example, an administrator associated with data utilization system 150 may activate data source device 130 and may determine that a new schema needs to be generated for data source device 130. The administrator may generate a new schema record 360 in schema repository 340. The schema may include a conversion function for converting data items in a particular data format into a common data format.

A schema-originating entity may be identified (block 520) and a schema field of use may be determined (block 530). For example, the administrator may specify the entity associated with the schema (e.g., an entity operating data utilization system 150) and a field of use for the generated schema (e.g., health, network devices, consumer products, weather, vehicles, etc.).

One or more aggregation sockets may be associated with the generated schema (block 540). For example, the administrator may select an existing aggregation socket 310 to associate with the generated schema or may generate a new aggregation socket 310. The aggregation socket 310 may be configured to ingest data from a particular data source device 130 and/or an application running on user device 160.

A particular schema may be associated with multiple aggregation sockets 310 and a particular aggregation socket 310 may associated with multiple schemas. However, if an aggregation socket 310 is associated with multiple schemas, a specification may need to be made as to when a particular one of the multiple schemas should be used. As an example, an aggregation socket 310 may ingest data items of multiple data types and/or data items from multiple data source devices 130 and each data type of data source device 130 may be assigned to a different one of the multiple schemas. As another example, different schemas may be used during different time periods (e.g., business hours vs. non-business hours, different days of the week, etc.).

One or more data processing modules may be associated with the generated schema (block 550). For example, the administrator may specify one or more data processing modules 330 that are to be associated with the generated schema. Thus, when the schema is used to convert a data item into the common data format, the data item may be provided to the specified data processing modules. The data processing modules may, for example, tag the data with various tags (e.g., a field of use tag, an originating entity tag, etc.). As another example, a data processing module may tag the data with tags in a particular field of use. As yet another example, a data processing module 330 may serve as an interface with a particular device or application (e.g., an application running on user device 160, metadata system 140, etc.).

Figure 6:
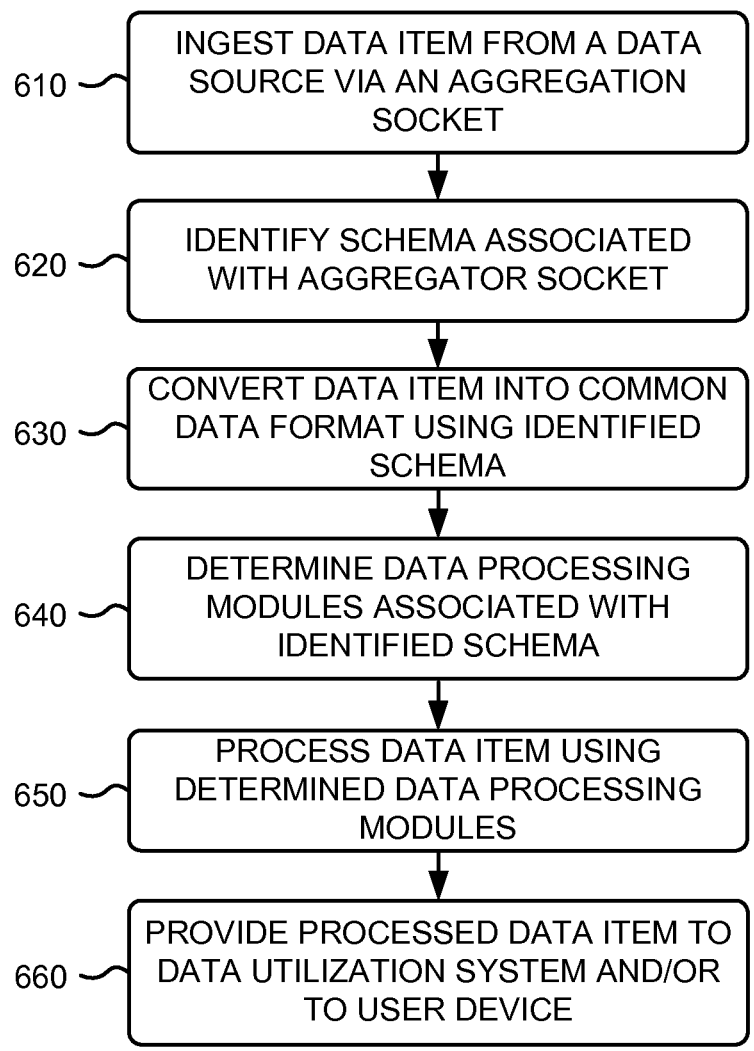
FIG. 6 is a flowchart for aggregating data according to an implementation described herein.

FIG. 6 is a flowchart for aggregating data according to an implementation described herein. In some implementations, the process of FIG. 6 may be performed by data aggregation system 110. In other implementations, some or all of the process of FIG. 6 may be performed by another device or a group of devices separate from and/or including data aggregation system 110. Furthermore, in other implementations, the process of FIG. 6 may include fewer blocks, additional blocks, different blocks, or differently arranged blocks.

The process of FIG. 6 may include ingesting a data item from a data source via an aggregation socket (block 610). For example, data source device 130 may generate a data item and may be configured to send data items to a particular aggregation socket 310 in data aggregation system 110. As another example, an application running on user device 160 may be configured to provide data items to an aggregation socket 310. The aggregation socket 310 may ingest the data item and may provide the data item to communication bus 320.

A schema associated with the aggregation socket may be identified (block 620) and the data item may be converted into a common data format using the identified schema (block 630). For example, communication bus 320 may access schema repository 340 and identify a schema associated with the aggregation socket 310. If the aggregation socket 310 is associated with multiple schema, communication bus 320 may select a particular schema based on one or more criteria (e.g., a data type associated with the received data item, a device associated with the received data item, a time period during which the data item has been received, etc.). Communication bus 320 may use the selected schema to convert the received data item into a common data format data item and store the common data format data item in common format data storage 350. In some implementations, the common data format data item may be stored in a compact binary format.

The entirety of the data item need not be converted and stored in common format data storage 350. As an example, if the data item corresponds to a large video file, the entire video file may be stored somewhere else. For example, data source device 130 may capture a video file and may upload the video file to a data storage device associated with data utilization system 150. Data source device 130 may further provide information relating to the captured video file (e.g., metadata associated with the video file, including a link to the storage location of the video file) to data aggregation system 110 and data aggregation system 110 may convert the received information to the common data format.

Data processing modules associated with the identified schema may be determined (block 640) and the data item may be processed using the determined data modules (block 650). For example, communication bus 320 may determine one or more data processing modules 330 associated with the selected schema and may provide the data item to the one or more data processing modules 330 for processing based on a sequence specified in data processing modules field 374 of schema record 360 associated with the selected schema. For example, data processing module 330 may tag the data item with one or more tags, may provide the data item to reputation engine 410 and/or provenance engine 420 for processing, may perform signal processing operations on the data item (e.g., a smoothing operation, a signal processing filter operation, etc.), may perform word processing operations on the data item (e.g., s spell checking operation, an indexing operation, a translation operation, etc.), and/or may perform another type of operation on the data item.

The processed data item may be provided to a data utilization system and/or to a user device (block 660). For example, once the data item is stored in common format data storage 350, an indication may be sent via API 355 to data utilization system 150 and/or to user device 160. As another example, common data storage 350 may make available an index of stored data items via API 355 to data utilization system 150 and/or to user device 160.

Figure 7:
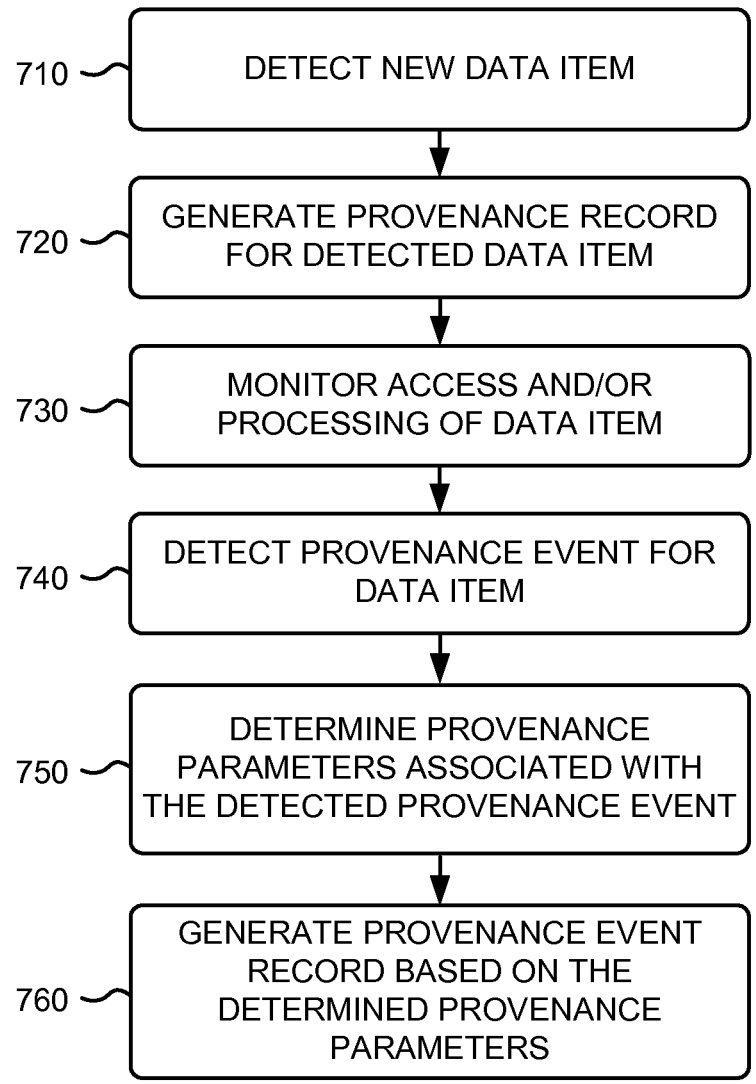
FIG. 7 is a flowchart for managing provenance for a data item according to an implementation described herein.

FIG. 7 is a flowchart for managing provenance for a data item according to an implementation described herein. In some implementations, the process of FIG. 7 may be performed by metadata system 140. In other implementations, some or all of the process of FIG. 7 may be performed by another device or a group of devices separate from and/or including metadata system 140. Furthermore, in other implementations, the process of FIG. 7 may include fewer blocks, additional blocks, different blocks, or differently arranged blocks.

The process of FIG. 7 may include detecting a new data item (block 710) and generating a provenance record for the detected data item (block 720). For example, provenance engine 420 may receive an indication from data aggregation system 110 that a new data item has been stored in common data format storage 350 (e.g., via a particular data processing module 330 that acts as an interface between communication bus 320 and provenance engine 420). As another example, provenance engine 420 may access common data format storage 350 at particular intervals to identify new data items stored in common data format storage 350. As yet another example, data source device 130 may send an indication to provenance engine 420 that data source device 130 has sent a new data item to data aggregation system 110. In response, provenance engine 420 may generate a new provenance record 450 and may associate the new provenance record 450 with the detected data item. An entity associated with the data item may configure provenance engine 420 to record all provenance events associated with the new data item or to record particular types of provenance events. Furthermore, the entity may configure provenance engine 420 to generate an alert whenever a particular type of provenance event is detected (e.g., a particular device attempts to modify the data item, a particular number of different devices have accessed the data item, the data item has not been accessed within a particular time period, etc.).

Access and/or processing of the data item may be monitored (block 730) and a provenance event for the data item may be detected (blocks 740). As an example, common data format storage 350 may send an alert to provenance engine 420 whenever the data item is accessed, copied, modified and/or otherwise used by an entity, application, or device. In some implementations, an alert may be configured only for particular types of provenance events. In other implementations, an alert may be generated for any type of provenance event and event filter 424 may be configured to filter out particular types of provenance events.

As another example, audit engine 422 may receive indications of provenance records from other devices. For example, data utilization system 150 may be configured to alert provenance engine 420 when data utilization system 150 accesses data items in common format data storage 350. As yet another example, audit engine 422 may instruct an application running on user device 160 to inform audit engine 422 whenever the application accesses data items stored in common format data storage 350. Furthermore, if audit engine 422 detects a provenance event, audit engine 422 may obtain additional information about the provenance event by querying the device, application, or entity that originated the provenance event.

Provenance parameters may be determined for the detected provenance event (block 750) and a provenance event record may be generated based on the determined provenance parameters (block 760). In some implementations, audit engine 422 may receive all requested provenance parameters in an initial alert or indication of the provenance event. In other implementations, audit engine 422 may obtain additional provenance parameters in response to receiving an alert or indication of the provenance event. The provenance parameters may include parameters relating to who, what, where, when, and why. For example, with respect to "who," provenance engine 420 may determine a device, application, or entity associated with the particular provenance event, such as a device or user that accessed the data item. With respect to "what," provenance engine 420 may identify a type of provenance event, such as whether the data item was accessed, what fields or portions of the data item were accessed, whether the data item was modified, whether a particular field or portion of the data item was changed, whether the data item was copied, and/or another type of provenance event.

With respect to "where," provenance engine 420 may identify a network location, and/or a physical location, associated with the provenance event. For example, provenance engine 420 may determine a network address of a device that accessed the data item. With respect to "when," provenance engine 420 may generate a time stamp for the provenance event based on the time and date at which the provenance event occurred. With respect to "why," provenance engine 420 may determine the cause of the provenance event, such as a triggering condition (e.g., a particular application requested to access the data item, etc.).

Furthermore, provenance engine 420 may record other parameters, such as a system state at the time that the provenance event occurred. The system state information may include information about the state of data aggregation system 110, network 120, data source device 130 (if associated with the provenance event), metadata system 140, data utilization system 150, and/or user device 160 (if associated with the provenance event). The system state information may include, for example, whether a particular component, function, connection, and/or application was functioning, the load of the system, the capacity of the system, the number of active sessions running on the system, and/or any other type of system state information.

Figure 8:
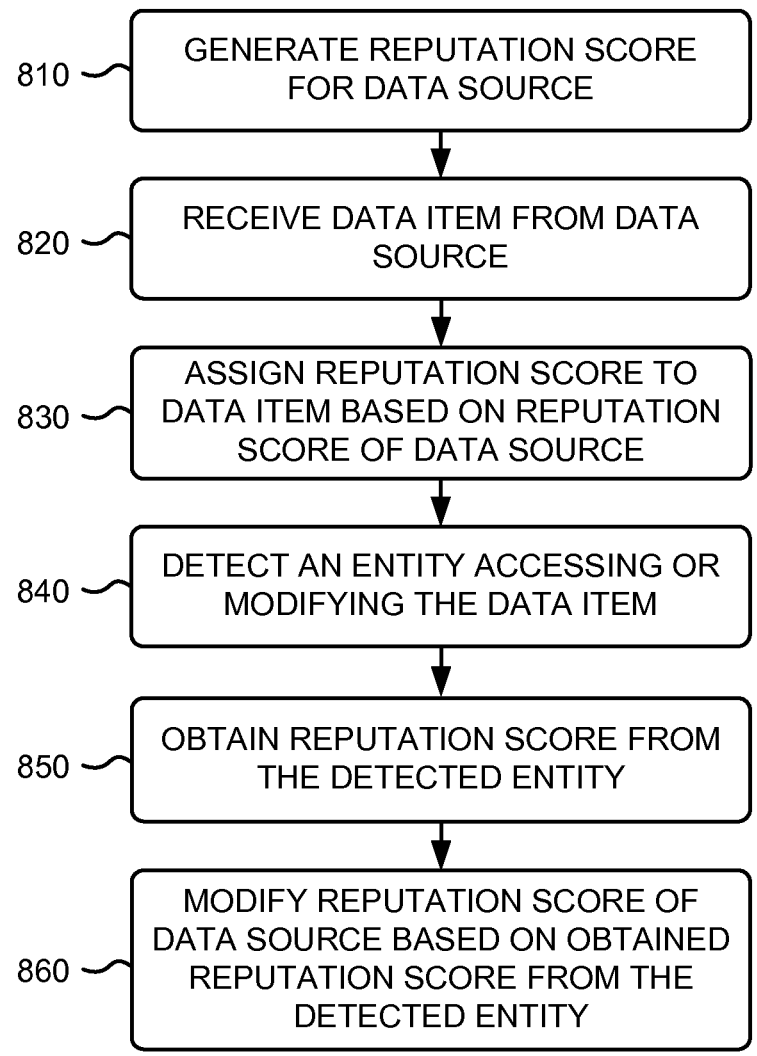
FIG. 8 is a flowchart for managing reputation according to an implementation described herein.

FIG. 8 is a flowchart for managing reputation according to an implementation described herein. In some implementations, the process of FIG. 8 may be performed by metadata system 140. In other implementations, some or all of the process of FIG. 8 may be performed by another device or a group of devices separate from and/or including metadata system 140. Furthermore, in other implementations, the process of FIG. 8 may include fewer blocks, additional blocks, different blocks, or differently arranged blocks.

The process of FIG. 8 may include generating a reputation score for a data source (block 810). For example, reputation engine 410 may assign an initial reputation score to a data source based on one or more parameters. As an example, the initial reputation score may be based on a default initial reputation score, based on an entity (e.g., company, organization, person, etc.) associated with the data source, based on a type of device (e.g., make and model, software version, etc.) associated with the device, based on membership in a group of devices (e.g., based on the device being on a network with a particular reputation score, etc.), and/or based on another criterion.

A data item may be received from the data source (block 820) and a reputation score may be assigned to the data item based on the reputation score of the data source (block 830). For example, data source device 130 or an application running on user device 160 may generate a data item and may provide the data item to data aggregation system 110. Data aggregation system 110 may convert the data item to the common data format, may store the converted data item in common data format storage 350, and may alert reputation engine 410 about the converted data item via a particular data processing module 330 that functions as an interface between data aggregation system 110 and reputation engine 410. Reputation engine 410 may assign a reputation score to the converted data item based on the reputation score of the source of the data item.

An entity may be detected accessing or modifying the data item (block 840) and a reputation score may be obtained from the detected entity (block 850). For example, data utilization system 150 may access the data item a particular number of times over a particular period of time. Provenance engine 420 may record a provenance event each time the data item is accessed. Reputation engine 410 may access provenance DB 426 to determine the number of times the data item has been accessed as well as which entity has accessed the data item. Reputation engine 410 may then determine the reputation score of the accessing entity from reputation DB 415.

The reputation score of the data source may be modified based on the reputation score obtained from the detected entity (block 860). For example, if the data item is accessed a particular number of times, reputation engine 410 may interpret the number of accesses as the data item being considered useful and reliable by data utilization system 150. If data utilization system 150 is associated with a higher reputation score than the reputation score of the data item, the reputation score of the entity that originated the data item may be increased. As another example, an entity accessing the data item may generate an indication that the data item is unreliable or inaccurate. For example, assume data utilization system 150 is collecting sensor readings from five different data source devices 130 of the same type and one of the data source devices 130 generates readings that are different from the other data source devices 130 by a particular amount. In this scenario, data utilization system 150 may stop accessing data items of the one of the data source devices 130 and may continue to access data items from the other four data source devices 130. Alternatively or additionally, data utilization system 150 may generate an indication that the one of the data source devices 130 is not reliable. In response, reputation engine 410 may decrease the reputation score of the one data source device 130.

In some implementations, a group of devices may exchange information about the reputation of their data sources and may develop a reputation cluster. Thus, devices in the reputation cluster may prefer data sources from other devices in the reputation cluster.

Reputation scores for data items may be used to make faster decisions. In a system with a large number of data sources generating a large number of data items, a device or entity that makes decisions based on the data items may be experiencing a great deal of noise. The decision-making device or entity may use the reputation scores to re-organize the data so that high quality data items with high reputation scores are given priority. For example, data items may be sorted based on reputation scores of the data sources of the data items. As an example, a doctor talking with a patient may be able to make a faster decision about a recommendation to the patient based on data items associated with the patient (e.g., by giving priority to a data from a reliable fitness device over self-reported data from the patient's mobile device). As another example, when determining locations for a power outage, a device with a history of intermittent failures may be given a low priority when the device reports a power failure.

Figure 9A:
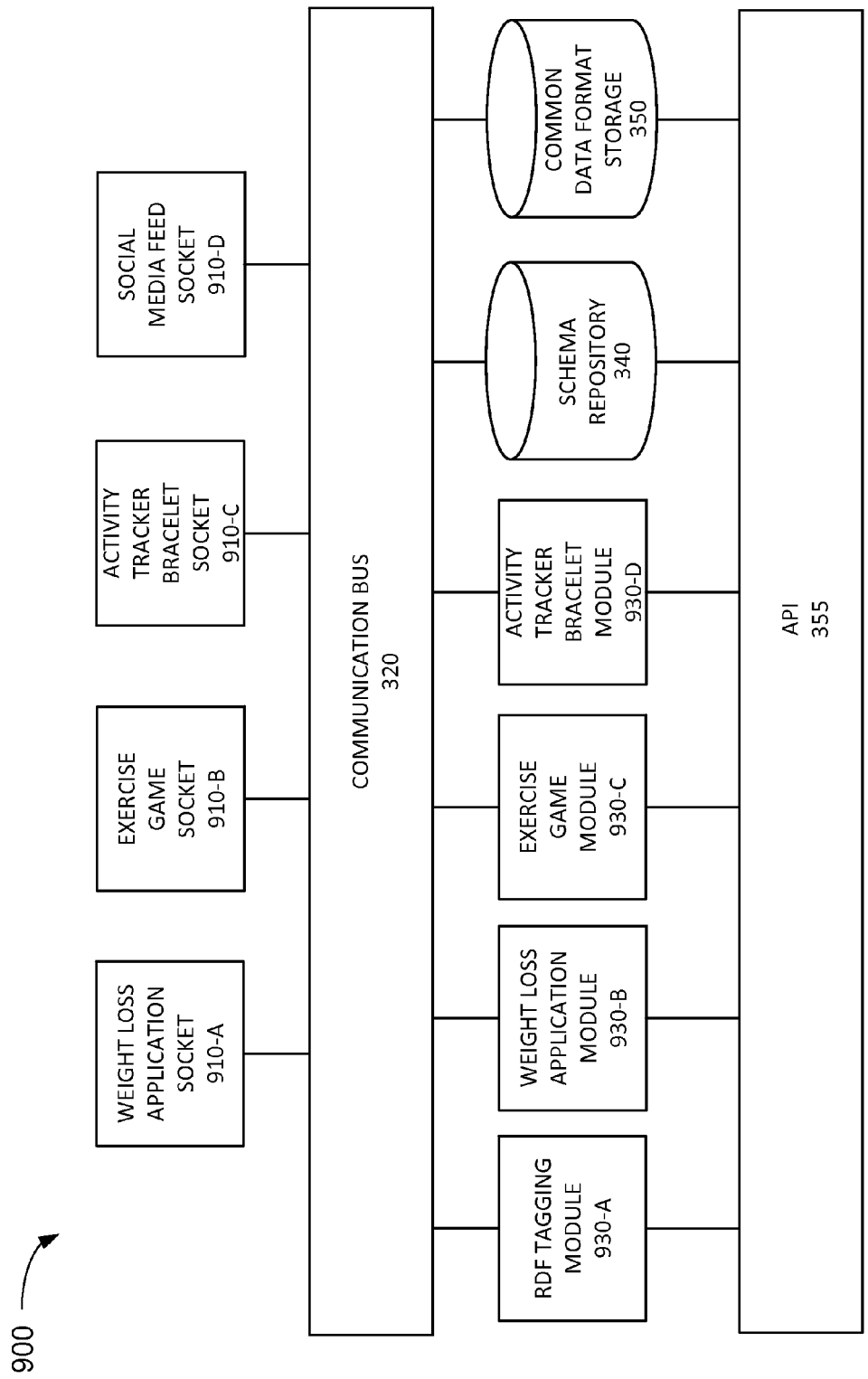
FIGS. 9A-9C are diagrams of a first exemplary system according to an implementation described herein.
Figure 9B:
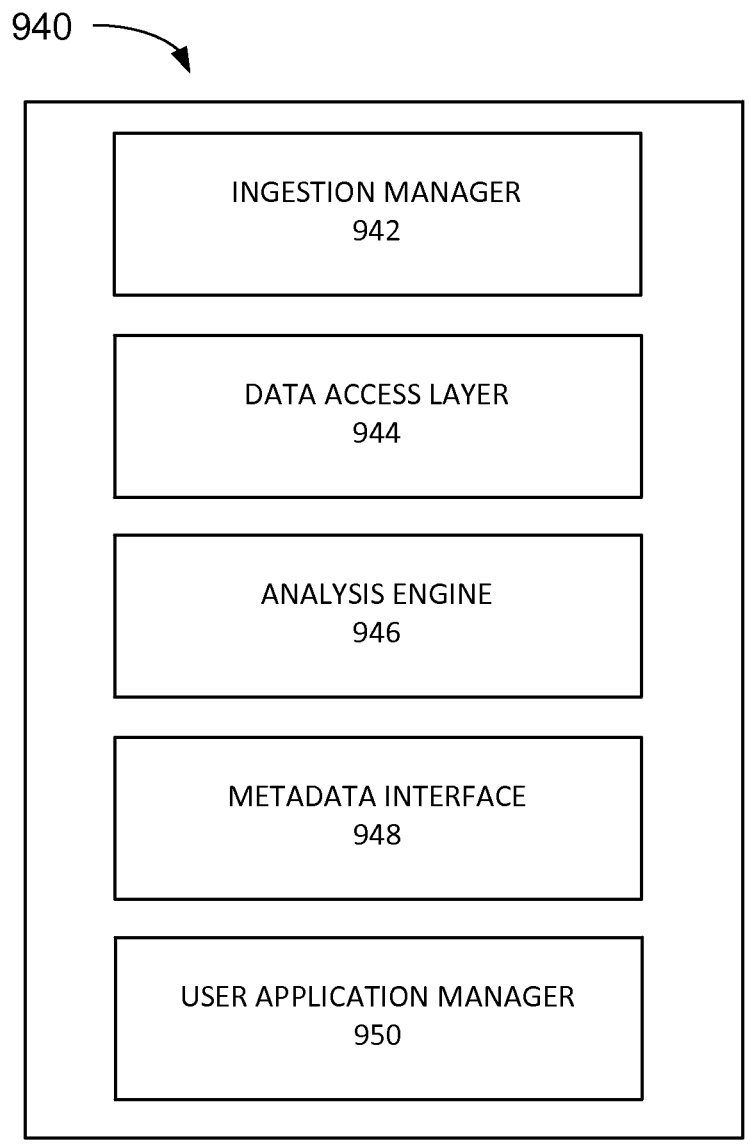
Figure 9C:
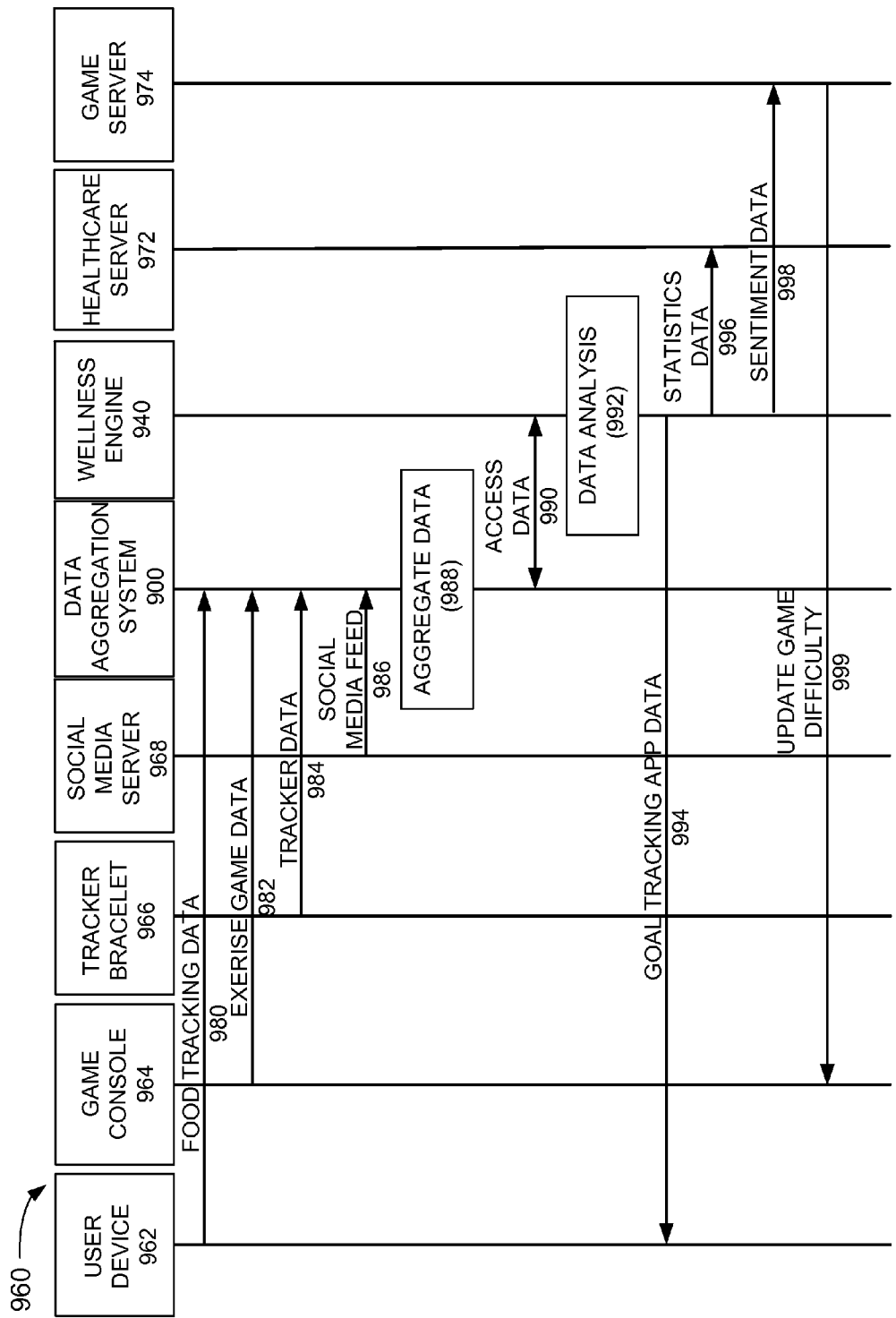

FIGS. 9A-9C are diagrams of a first exemplary system according to an implementation described herein. FIGS. 9A-9C illustrate a wellness system that helps users track their health and wellness goals. Users may use various devices and/or application to track wellness goals and a wellness system may aggregate the data from the various devices and/or applications to help users track their wellness goals and/or to collect and analyze wellness information.

As shown in FIG. 9A, a data aggregation system 900 may include communication bus 320, schema repository 340, and common data format storage 350 as describe above with reference to FIG. 3A. Moreover, data aggregation system 900 may include four aggregation sockets: a weight loss application socket 910-A, an exercise game socket 910-B, an activity tracker bracelet socket 910-C, and a social media feed socket 910-D. Furthermore, data aggregation system 900 may include an RDF tagging module 930-A, a weight loss application module 930-B, an exercise game module 930-C, and an activity tracker bracelet module 930-D.

Weight loss application socket 910-A may be configured to ingest data from a weight loss application installed on user device 160. The user of user device 160 may use the weight loss application to log meals eaten by the user and the weight loss application may compute the number of calories that the user has consumed. The weight loss application may send information entered by the user to weight loss application socket 910-A. Weight loss application socket 910-A may be associated with a first schema in schema repository 340 and communication bus 320 may use the first schema to convert data items ingested by weight loss application socket 910-A into a common data format used to store items in common data format storage 350.

Exercise game socket 910-B may be configured to ingest data from an exercise game running on a game console. For example, the exercise game may interact with a user via a motion sensor input device that the user holds while playing activity games. The exercise game may track the user's activity and may determine how many calories the user has burned while playing the game. The exercise game application running on the game console may send information collected about the user's game activities to exercise game socket 910-B. Exercise game socket 910-B may be associated with a second schema in schema repository 340 and communication bus 320 may use the second schema to convert data items ingested by exercise game socket 910-B into a common data format used to store items in common data format storage 350.

Activity tracker bracelet socket 910-C may be configured to ingest data from an activity tracker bracelet. The user may wear the activity tracker bracelet throughout the day and the activity tracker bracelet may collect information about the user's movement. For example, the activity tracker bracelet may count the number of steps the user has taken during a particular day. The activity tracker bracelet may send information collected about the user's activities to activity tracker bracelet socket 910-C. Activity tracker bracelet socket 910-C may be associated with a third schema in schema repository 340 and communication bus 320 may use the third schema to convert data items ingested by activity tracker bracelet socket 910-C into a common data format used to store items in common data format storage 350.

Social media feed socket 910-D may be configured to ingest data from social media accounts (e.g., a Twitter account, a Facebook account, an Instagram account, etc.) associated with users. For example, social media feed socket 910-D may generate a subscription to the user's Twitter account and when the user posts a Twitter message, social media feed socket 910-A may ingest the message. Social media feed socket 910-D may be associated with a fourth schema in schema repository 340 and communication bus 320 may use the fourth schema to convert data items ingested by social media feed socket 910-D into a common data format used to store items in common data format storage 350.

Communication bus 320 may receive data items from weight loss application socket 910-A, exercise game socket 910-B, activity tracker bracelet socket 910-C, and social media feed socket 910-D, may convert the data items to a common data format, and may store converted data items in common data format storage 350.

RDF tagging module 930-A may tag all data items converted by communication bus 320 with one or more RDF tags. For example, RDF tagging module 930-A may tag each item with a field of use tag indicating a "health and wellness" field of use, may tag each data item with information identifying the user associated with the data item, and may tag each data item with information identifying an entity associated with each data item (e.g., the company that published the weight loss application, the company that sells the exercise game, the company that sells the activity tracker bracelet, etc.).

Weight loss application module 930-B may process data items ingested via weight loss application socket 910-A. For example, weight loss application module 930-B may tag food entries based on food categories. Furthermore, a server device associated with the weight loss application may interface with the ingested data items via weight loss application module 930-B. Exercise game module 930-B may process data items ingested via exercise game socket 910-B. For example, exercise game module 930-B may collect information about which activity games are popular with users and may provide the information to a game server associated with the exercise game. Activity tracker bracelet module 930-D may process data items ingested via activity tracker bracelet socket 910-C. For example, activity tracker bracelet module 930-D may plot a user's activity level over the course of a day based on information included in data items ingested via activity tracker bracelet socket 910-C.

FIG. 9B illustrates an exemplary wellness engine 940 that may correspond to data utilization system 150 of FIG. 1. As shown in FIG. 9B, wellness engine 940 may include an ingestion manager 942, a data access layer 944, an analysis engine 946, a metadata interface 948, and a user application manager 950.

Ingestion manager 942 may manage aggregation sockets of data aggregation system 110. For example, ingestion manager 942 may activate, de-activate, update, and/or otherwise manage an aggregation socket. As another example, ingestion manager 942 may configure a device to provide data to a particular aggregation socket. Data access layer 944 may be configured to enable wellness engine 940 to access data items stored in common data format storage 350.

Analysis engine 946 may include one or more analysis engines for analyzing data stored in common data format storage 350. As an example, analysis engine 946 may include a goal tracking engine to keep track of the goals set by a user. As another example, analysis engine 946 may include a sentiment engine that determines a particular user's sentiment based on a social media feed. For example, the sentiment engine may analyze the user's Twitter messages to determine whether the user is expressing a positive sentiment or a negative sentiment. As yet another example, analysis engine 946 may collect anonymized statistics about users and may provide the anonymized statistics to a healthcare server, such as a server device associated with a health insurance provider. The statistics may include, for example, information relating user age to activity levels, average calories consumed in a particular geographic area, etc.

Metadata interface 948 may be configured to communicate with metadata system 140. As an example, metadata interface 948 may request a reputation score for a data item from reputation engine 410. As another example, metadata interface 948 may request to access provenance DB 426 to determine provenance information for a particular data item stored in common data format storage 350. User application manager 950 may manage user applications associated with wellness engine 940. For example, wellness engine 940 may provide a user application to user device 160, which provides aggregated wellness information to the user, such as the total calorie balance of the user for each day.

FIG. 9C illustrates an exemplary signal flow scenario 960 that includes signal flows between a user device 962, a game console 964, a tracker bracelet 966, a social media server 968, data aggregation system 900, wellness engine 940, a healthcare server 972, and a game server 974.

Signal flow scenario 960 may include user device 962, on which the weight loss application is running, sending food tracking data to data aggregation system 900 (signal 980). Weight loss application socket 910-A may ingest the food tracking data and communication bus 320 may convert the food tracking data into a common data format using a schema associated with weight loss application socket 910-A and store the converted data in common data format storage 350 (block 988).

Game console 964, on which the exercise game is running, may send exercise game data to data aggregation system 900 (signal 982). Game exercise socket 910-B may ingest the exercise game data and communication bus 320 may convert the exercise game data into a common data format using a schema associated with game exercise socket 910-B and store the converted data in common data format storage 350 (block 988).

Activity tracker bracelet 966 may send activity tracker data to data aggregation system 900 (signal 984). Activity tracker bracelet socket 910-C may ingest the activity tracker data and communication bus 320 may convert the activity tracker data into a common data format using a schema associated with activity tracker bracelet socket 910-C and store the converted data in common data format storage 350 (block 988).

Social media server 968 may publish social media updates made by users. Social media feed socket 910-D may subscribe to the social media updates, or may download the social media updates from social media server 968, and may ingest the social media updates. Communication bus 320 may convert the social media updates into a common data format using a schema associated with social media feed socket 910-D and store the converted data in common data format storage 350 (block 988).

Wellness engine 940 may access the data stored in common data format storage 350 via data access layer 944 (signal 990) and may perform data analysis on the data using analysis engine 946 (block 992). Analysis engine 946 may, for example, calculate a total caloric balance for a user and may generate a report that tracks the user's wellness goals. Wellness engine 940 may then send a report to a goal tracking application running on user device 160 (signal 994).

Furthermore, analysis engine 946 may generate a statistics data based on the aggregated data and may send the statistics data to healthcare server 972 (signal 996). The statistics may include, for example, information relating user age to activity levels, average calories consumed in a particular geographic area, etc. Still further, analysis engine 946 may determine sentiment data from the ingested social media updates and may correlate the sentiment data with the ingested exercise game data. For example, if a user was playing the exercise game and posted a social media update while playing the exercise game, analysis engine 946 may determine a sentiment value for the social media update. If the sentiment value is negative, and such negative sentiments are correlated with a large number of users while playing the game, this may indicate that the game difficulty is set too high. Wellness engine 940 may provide the sentiment data to game server 974 (signal 998) associated with the exercise game. In response, game server 974 may adjust the difficulty of the game (signal 999).

Figure 10A:
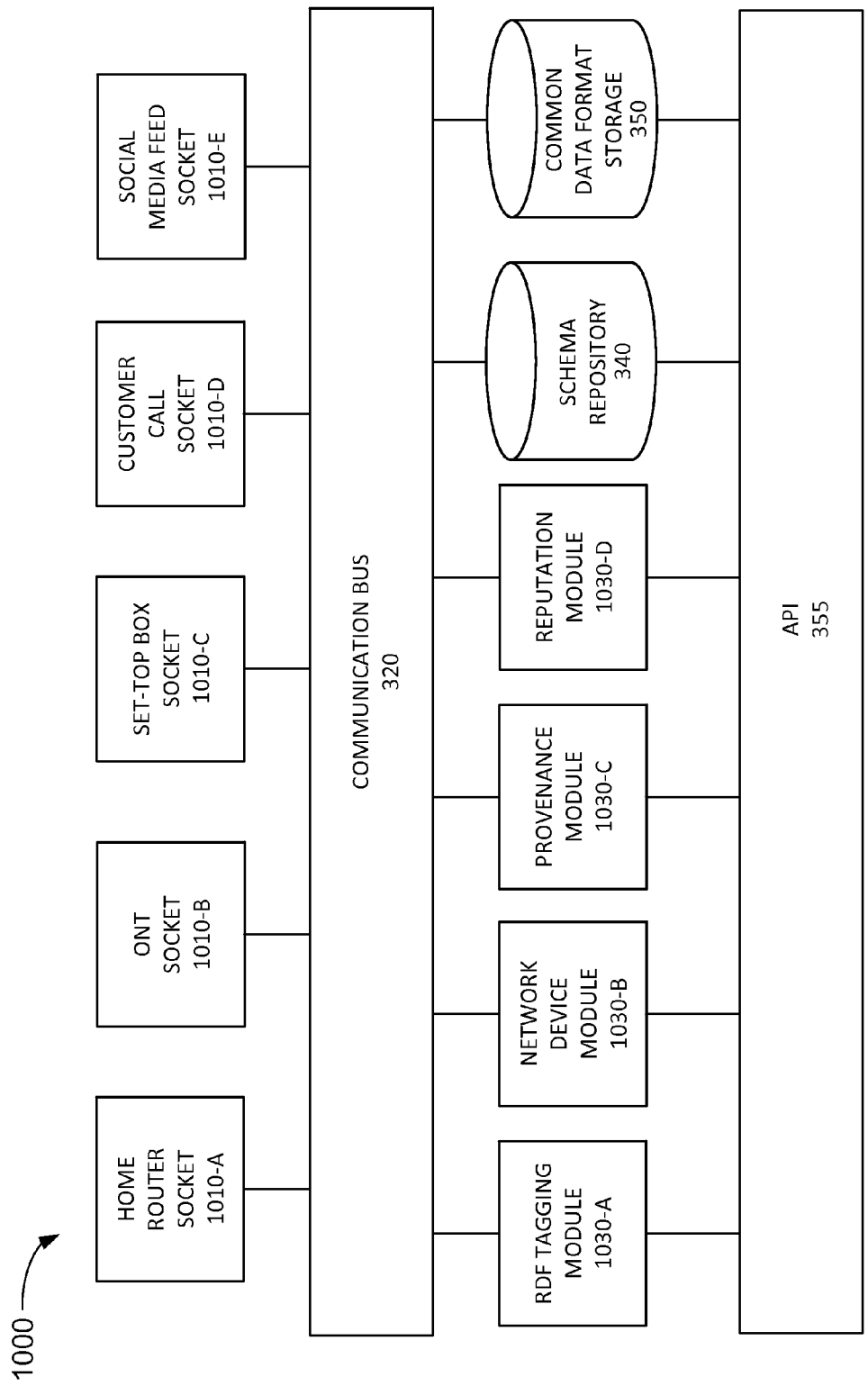
FIGS. 10A-10C are diagrams of a second exemplary system according to an implementation described herein.
Figure 10B:
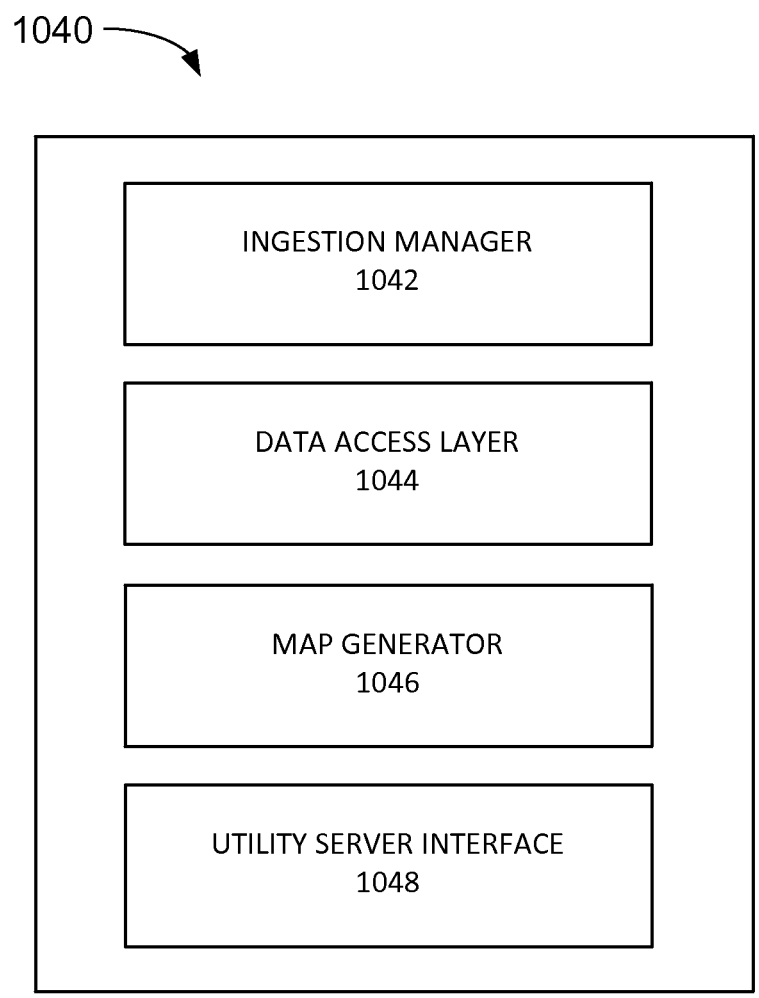
Figure 10C:
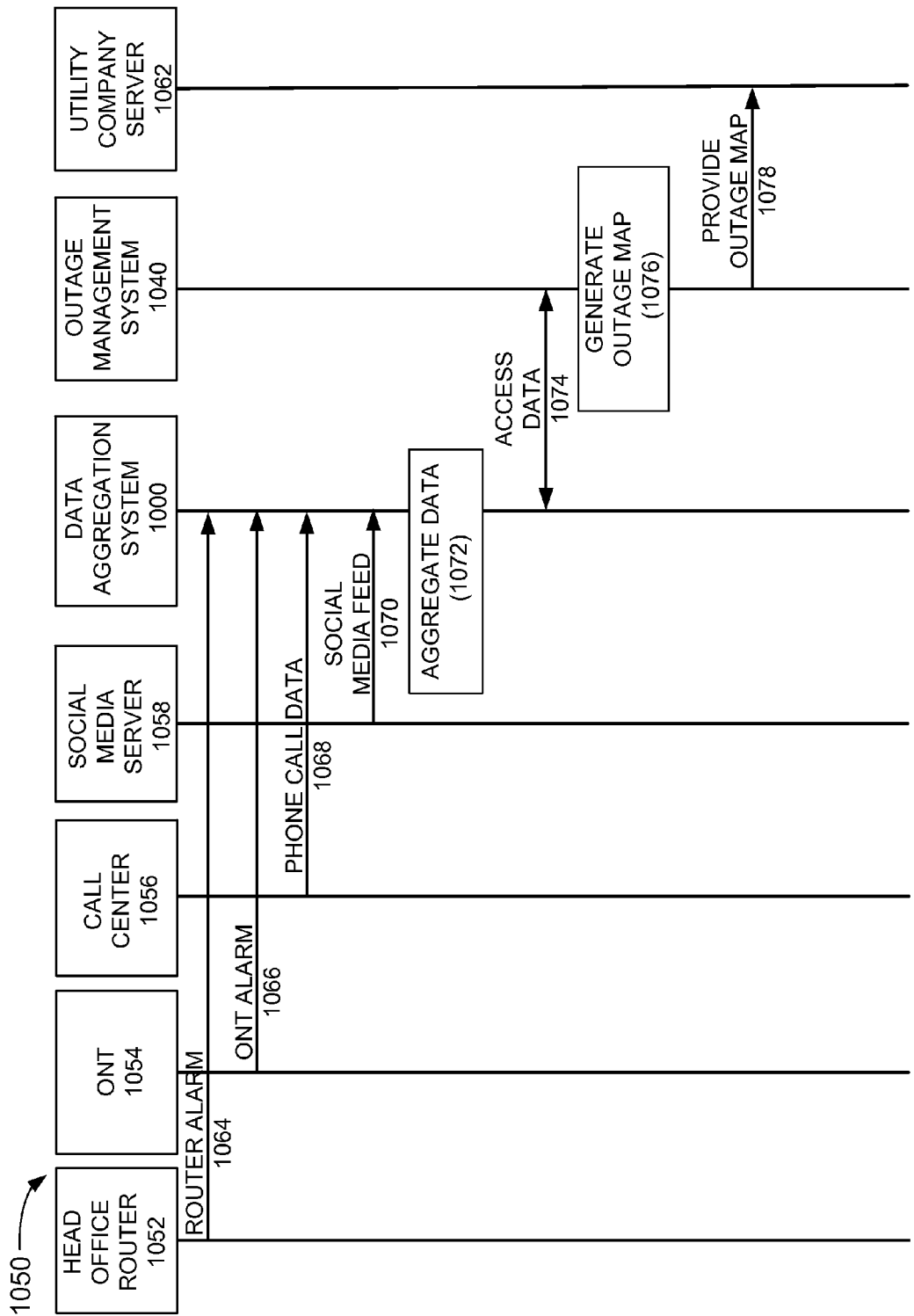

FIGS. 10A-10C are diagrams of a second exemplary system according to an implementation described herein. FIGS. 10A-10C illustrate a power outage system that helps a utility company track power outages. Typically, a utility company may only be able to track a power outage based on telephone calls received from customers complaining about a loss of power. However, other indicators of the loss of power may be available. For example, a provider of communication services may detect loss of functionality of network devices provided to customers when the power goes out. Furthermore, different customers may have different network devices and the different network devices may be associated with alarm messages using different protocols and/or data formats. A power outage system may collect alarm information from different types of devices, may aggregate the data using data aggregation system 110, and may generate a power outage map based on the aggregated information.

As shown in FIG. 10A, a data aggregation system 1000 may include communication bus 320, schema repository 340, and common data format storage 350 as describe above with reference to FIG. 3A. Moreover, data aggregation system 1000 may include five aggregation sockets: a home router socket 1010-A, an optical network terminal (ONT) socket 1010-B, a set-top box socket 1010-C, a customer call socket 1010-D, and a social media feed socket 1010-E. Furthermore, data aggregation system 1000 may include an RDF tagging module 1030-A, a network device module 1030-B, a provenance module 1030-C, and a reputation module 1030-D.

Home router socket 1010-A may be configured to ingest failure alarm data relating to home routers in customer's homes. Home router socket 1010-A may be associated with a first schema in schema repository 340 and communication bus 320 may use the first schema to convert data items ingested by home router socket 1010-A into a common data format used to store items in common data format storage 350.

ONT socket 1010-B may be configured to ingest failure alarm data relating to ONTs in customer's homes. ONT socket 1010-B may be associated with a second schema in schema repository 340 and communication bus 320 may use the second schema to convert data items ingested by ONT socket 1010-B into a common data format used to store items in common data format storage 350.

Set-top box socket 1010-C may be configured to ingest failure alarm data relating to set-top boxes in customer's homes. Set-top box socket 1010-C may be associated with a third schema in schema repository 340 and communication bus 320 may use the third schema to convert data items ingested by set-top box socket 1010-C into a common data format used to store items in common data format storage 350.

Customer call socket 1010-D may be configured to ingest customer call data relating to power outages. For example, if a telephone number, associated with a call center for the utility company, for reporting a power outage is called by a customer, the call center may report the customer's phone number to customer call socket 1010-D. Customer call socket 1010-D may be associated with a fourth schema in schema repository 340 and communication bus 320 may use the fourth schema to convert data items ingested by customer call socket 1010-D into a common data format used to store items in common data format storage 350.

Social media feed socket 1010-E may be configured to ingest data from social media accounts (e.g., a Twitter account, a Facebook account, an Instagram account, etc.) associated with users. For example, social media feed socket 1010-E may generate a subscription to the user's Facebook account and when the user posts a Facebook message, social media feed socket 1010-E may ingest the message. Social media feed socket 1010-E may be associated with a fifth schema in schema repository 340 and communication bus 320 may use the fifth schema to convert data items ingested by social media feed socket 1010-E into a common data format used to store items in common data format storage 350. The ingested social media messages may be analyzed for terms indicative of a power outage.

RDF tagging module 1030-A may tag all data items converted by communication bus 320 with one or more RDF tags. For example, RDF tagging module 1030-A may tag each item with a field of use tag indicating a "power outage" field of use, may tag each data item with information identifying a particular power outage event, may tag social media messages with a power outage tag if the social media message includes a term indicative of a power outage, etc. Network device module 1030-B may interface with a network management system (not shown in FIG. 10A) that includes location information for home routers, ONTs, and/or set-top boxes. For a data item corresponding to a network device alarm received via home router socket 1010-A, ONT socket 1010-B, or set-top box socket 1010-C, network device module 1030-B may determine the location of the device associated with the alarm by communicating with the network management system and may tag the data item with the location of the device.

Provenance module 1030-C may communicate with provenance engine 420 and may provide information relating to provenance events, associated with data items stored in common format data storage 35, to provenance engine 420.

Reputation module 1030-D may determine the reputation of a particular network device by communicating with reputation engine 410 and may assign a weight to data items associated with the particular network device based on a reputation score associated with the particular data item.

FIG. 10B illustrates an exemplary power outage management system 1040 that may correspond to data utilization system 150 of FIG. 1. Power outage management system 1040 may obtain data aggregated by data aggregation system 1000 and may generate a power outage map based on the obtained information. As shown in FIG. 10B, power outage management system 1040 may include an ingestion manager 1042, a data access layer 1044, a map generator 1046, and a utility server interface 1048.

Ingestion manager 1042 may manage aggregation sockets of data aggregation system 110. For example, ingestion manager 1042 may activate, de-activate, update, and/or otherwise manage an aggregation socket. As another example, ingestion manager 1042 may configure a network device to provide data to a particular aggregation socket. Data access layer 1044 may be configured to enable power outage management system 1040 to access data items stored in common data format storage 350. Map generator 1046 may generate a power outage map for a power outage event based on information obtained by data aggregation system 1000. For example, map generator 1046 may plot locations of devices associated with a network alarm on a map. Map generator 1046 may further correlate the locations of the devices with locations of users associated with phone calls to the utility company and/or associated with social media messages that include terms indicative of a power outage. Utility server interface 1048 may provide the generated map to a utility server associated with the utility company.

FIG. 10C illustrates an exemplary signal flow scenario 1050 that includes signal flows between a head office router 1052, an ONT 1054, a call center 1056, a social media server 1058, data aggregation system 1000, outage management system 1040, and a utility company server 1062. Signal flow scenario 1050 may include head office router 1052 sending a connection loss alarm to data aggregation system 1000 when head office router 1052 detects that a home router cannot be reached (signal 1064). Home router socket 1010-A may ingest home router alarm data and communication bus 320 may convert the home router alarm data into a common data format using a schema associated with home router socket 1010-A and store the converted data in common data format storage 350 (block 1072).

ONT 1054 may include a battery back-up power source which may activate and generate an alarm when ONT 1054 loses power. ONT 1054 may send the power loss alarm to data aggregation system 1000 (signal 1066). ONT socket 1010-B may ingest ONT alarm data and communication bus 320 may convert the ONT alarm data into a common data format using a schema associated with ONT socket 1010-B and store the converted data in common data format storage 350 (block 1072).

Call center 1056 may send information about phone numbers of users that placed a call to a phone number for reporting a power outage to data aggregation system 1000 (signal 1068). Customer call socket 1010-D may ingest the customer call data and communication bus 320 may convert the customer call data into a common data format using a schema associated with customer call socket 1010-D and store the converted data in common data format storage 350 (block 1072).

Social media server 1058 may provide a social media feed of messages posted by users to data aggregation system 1000 (signal 1070). Social media feed socket 1010-E may ingest the social media feed data and communication bus 320 may convert the social media feed data into a common data format using a schema associated with social media feed socket 1010-E and store the converted data in common data format storage 350 (block 1072). RDF tagging module 1030-A may tag a social media message with a power outage tag if the social media message includes phrases such as "we lost power," "no electricity," etc.

Data aggregation system 1000 may provide the aggregated data to power outage management system 1040 (signal 1074). Power outage management system 1040 may generate a power outage map based on the aggregated data (block 1076) and may provide the generated power outage map to utility company server 1062 (signal 1078).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5-8, and a series of signal flows have been described with respect to FIGS. 9C and 10C, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   generating, by a computer device, a plurality of schemas, wherein particular ones of the plurality of schemas convert data items of particular data types into a common data format;
   associating, by the computer device, particular ones of the plurality of schemas with particular ones of a plurality of aggregation sockets, wherein different ones of the plurality of aggregation sockets are configured to ingest data items of different data types;
   ingesting, by the computer device, a data item from a data source via an aggregation socket, of the plurality of aggregation sockets, wherein the aggregation socket is configured to ingest data items of a particular data type;
   identifying, by the computer device, a schema, of the plurality of schemas, associated with the aggregation socket;
   converting, by the computer device, the data item into a common data format using the identified schema;
   storing, by the computer device, the converted data item in a common data format storage associated with the computer device;
   providing, by the computer device, the stored data item to a data utilization system;
   sending, by the computer device, an indication to a provenance engine that the data item has been stored in the common data format storage;
   generating, by the provenance engine, a provenance record for the stored data item, in response to receiving the indication that the data item has been stored in the common data format storage, wherein the provenance record stores information identifying each event that includes accessing or modifying the stored data item, and wherein the provenance record is stored separately from the common data format storage;
   detecting an event that includes accessing or modifying the stored data item;
   sending, to the provenance engine, an alert that the stored data items has been accessed or modified, in response to detecting the event;
   generating, by the provenance engine, a provenance event record in the generated provenance record in response to the detected event;
   storing, by the provenance engine, one or more provenance parameters associated with the detected event in the generated provenance record;
   determining a reputation score associated with the data source;
   assigning the determined reputation score to the stored data item;
   determining that a particular entity, associated with a particular reputation score, has requested to access or modify the stored data item; and
   modifying the reputation score associated with the data source based on the particular reputation score associated with the particular entity.

2. The method of claim 1, further comprising:
   ingesting another data item from another data source via another aggregation socket, of the plurality of aggregation sockets, wherein the other aggregation socket is configured to ingest data items of another data type that is different from the particular data type;
   identifying another schema, of the plurality of schemas, associated with the other aggregation socket;
   converting the other data item into the common data format using the other identified schema; and
   storing the converted other data item in the common data format storage.

3. The method of claim 1, further comprising:
   identifying a data processing module associated with the identified schema; and
   processing the data item using the identified data processing module.

4. The method of claim 3, wherein the data processing module includes a Resource Description Framework tagging module, and wherein processing the data item using the identified data processing module includes:
   adding one or more Resource Description Framework tags to the stored data item based on the identified schema.

5. The method of claim 1, wherein the one or more provenance parameters include at least one of:
   information identifying a type of event associated with the detected event;
   information identifying an entity accessing or modifying the stored data item;
   information identifying a time and date associated with the event;
   information identifying a physical or network location associated with the event;
   information identifying a cause of the event; or
   information identifying a system state associated with the event.

6. The method of claim 1, wherein storing the converted data item in the common data format storage includes:
   storing the converted data item in a compact binary format.

7. The method of claim 1, further comprising:
   associating a field of use with the identified schema;
   associating an originating entity with the identified schema; and
   associating the aggregation socket with the identified schema.

8. A computer system comprising:
   one or more memory devices storing instructions; and
   one or more processors configured to execute the instructions to:
   generate a plurality of schemas, wherein particular ones of the plurality of schemas convert data items of particular data types into a common data format;

associate particular ones of the plurality of schemas with particular ones of a plurality of aggregation sockets, wherein different ones of the plurality of aggregation sockets are configured to ingest data items of different data types;
ingest a data item from a data source via an aggregation socket, of the plurality of aggregation sockets, wherein the aggregation socket is configured to ingest data items of a particular data type;
identify a schema, of the plurality of schemas, associated with the aggregation socket;
convert the data item into a common data format using the identified schema;
store the converted data item in a common data format storage associated with the computer system;
provide the stored data item to a data utilization system;
send an indication to a provenance engine that the data item has been stored in the common data format storage;
generate a provenance record for the stored data item, in response to receiving the indication that the data item has been stored in the common data format storage, wherein the provenance record stores information identifying each event that includes accessing or modifying the stored data item, and wherein the provenance record is stored separately from the common data format storage;
detect an event that includes accessing or modifying the stored data item based on receiving an alert that the stored data item has been accessed or modified;
generate a provenance event record in the generated provenance record in response to the detected event;
store one or more provenance parameters associated with the detected event in the generated provenance record;
determine a reputation score associated with the data source;
assign the determined reputation score to the stored data item;
determine that a particular entity, associated with a particular reputation score, has requested to access or modify the stored data item; and
modify the reputation score associated with the data source based on the particular reputation score associated with the particular entity.

9. The computer system of claim 8, wherein the one or more processors are further configured to:
ingest another data item from another data source via another aggregation socket, of the plurality of aggregation sockets, wherein the other aggregation socket is configured to ingest data items of another data type that is different from the particular data type;
identify another schema, of the plurality of schemas, associated with the other aggregation socket;
convert the other data item into the common data format using the other identified schema; and
store the converted other data item in the common data format storage.

10. The computer system of claim 8, wherein the one or more processors are further configured to:
identify a data processing module associated with the identified schema; and
process the data item using the identified data processing module.

11. The computer system of claim 10, wherein the data processing module includes a Resource Description Framework tagging module, and wherein, when processing the data item using the identified data processing module, the one or more processors are further configured to:
add one or more Resource Description Framework tags to the stored data item based on the identified schema.

12. The computer system of claim 8, wherein the one or more provenance parameters include at least one of:
information identifying a type of event associated with the detected event;
information identifying an entity accessing or modifying the stored data item;
information identifying a time and date associated with the event;
information identifying information identifying a physical or network location associated with the event;
information identifying a cause of the event; or
information identifying a system state associated with the event.

13. The computer system of claim 8, wherein the one or more processors are further configured to:
associate a field of use with the identified schema;
associate an originating entity with the identified schema; and
associate the aggregation socket with the identified schema.

14. The computer system of claim 8, wherein, when storing the converted data item in the common data format storage, the one or more processors are further configured to:
store the converted data item in a compact binary format.

15. One or more non-transitory computer-readable memory devices storing instructions executable by one or more processors, the one or more non-transitory computer-readable memory devices comprising:
one or more instructions to generate a plurality of schemas, wherein particular ones of the plurality of schemas convert data items of particular data types into a common data format;
one or more instructions to associate particular ones of the plurality of schemas with particular ones of a plurality of aggregation sockets, wherein different ones of the plurality of aggregation sockets are configured to ingest data items of different data types;
one or more instructions to ingest a data item from a data source via an aggregation socket, of the plurality of aggregation sockets, wherein the aggregation socket is configured to ingest data items of a particular data type;
one or more instructions to identify a schema, of the plurality of schemas, associated with the aggregation socket;
one or more instructions to convert the data item into a common data format using the identified schema;
one or more instructions to store the converted data item in a common data format storage;
one or more instructions to provide the stored data item to a data utilization system;
one or more instructions to send an indication to a provenance engine that the data item has been stored in the common data format storage;
one or more instructions to generate, by the provenance engine, a provenance record for the stored data item, in response to receiving the indication that the data item has been stored in the common data format storage, wherein the provenance record stores information identifying each event that includes accessing or modifying the stored data item, and wherein the provenance record is stored separately from the common data format storage;

one or more instructions to detect an event that includes accessing or modifying the stored data item;

one or more instructions to send, to the provenance engine, an alert that the stored data items has been accessed or modified, in response to detecting the event that includes accessing or modifying the stored data item;

one or more instructions to generate, by the provenance engine, a provenance event record in the generated provenance record in response to the detected event;

one or more instructions to store, by the provenance engine, one or more provenance parameters associated with the detected event in the generated provenance record;

one or more instructions to determine a reputation score associated with the data source;

one or more instructions to assign the determined reputation score to the stored data item;

one or more instructions to determine that a particular entity, associated with a particular reputation score, has requested to access or modify the stored data item; and one or more instructions to modify the reputation score associated with the data source based on the particular reputation score associated with the particular entity.

16. The one or more non-transitory computer-readable memory devices of claim 15, wherein the one or more provenance parameters include at least one of:

information identifying a type of event associated with the detected event;

information identifying an entity accessing or modifying the stored data item;

information identifying a time and date associated with the event;

information identifying a physical or network location associated with the event;

information identifying a cause of the event; or information identifying a system state associated with the event.

17. The one or more non-transitory computer-readable memory devices of claim 15, further comprising:

one or more instructions to associating a field of use with the identified schema;

one or more instructions to associating an originating entity with the identified schema; and one or more instructions to associating the aggregation socket with the identified schema.

18. The one or more non-transitory computer-readable memory devices of claim 15, further comprising:

one or more instructions to ingest another data item from another data source via another aggregation socket, of the plurality of aggregation sockets, wherein the other aggregation socket is configured to ingest data items of another data type that is different from the particular data types;

one or more instructions to identify another schema, of the plurality of schemas, associated with the other aggregation socket;

one or more instructions to convert the other data item into the common data format using the other identified other schema; and one or more instructions to store the converted other data item in the common data format storage.

19. The one or more non-transitory computer-readable memory devices of claim 18, further comprising:

one or more instructions to identify a data processing module associated with the identified other schema; and one or more instructions to process the data item using the identified data processing module.

20. The one or more non-transitory computer-readable memory devices of claim 19, wherein the data processing module includes a Resource Description Framework tagging module, and wherein the one or more instructions to process the data item using the identified data processing module further include:

one or more instructions to add one or more Resource Description Framework tags to the stored data item based on the identified schema.

\* \* \* \* \*